INVENTOR:
Floyd G. Steele

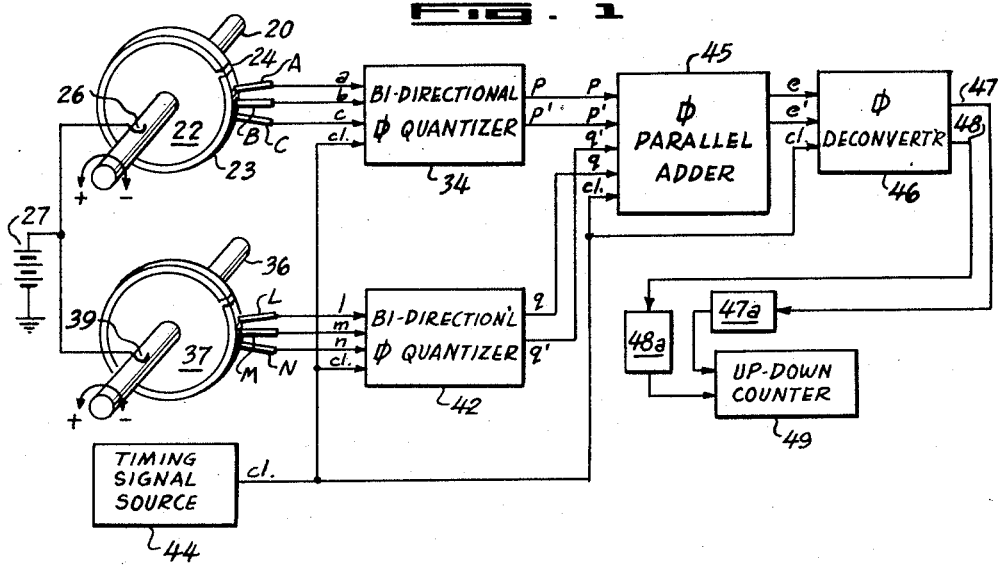
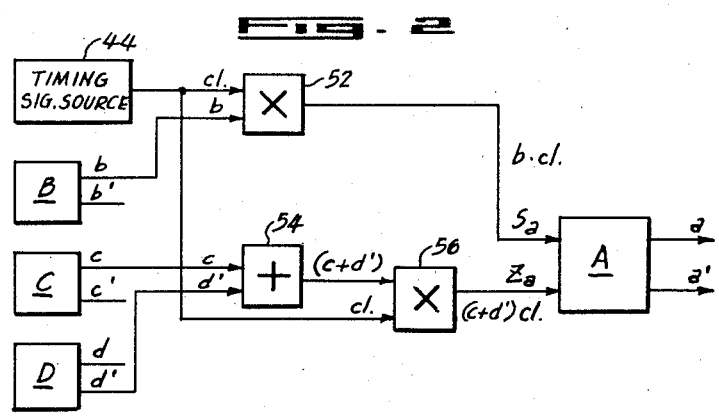

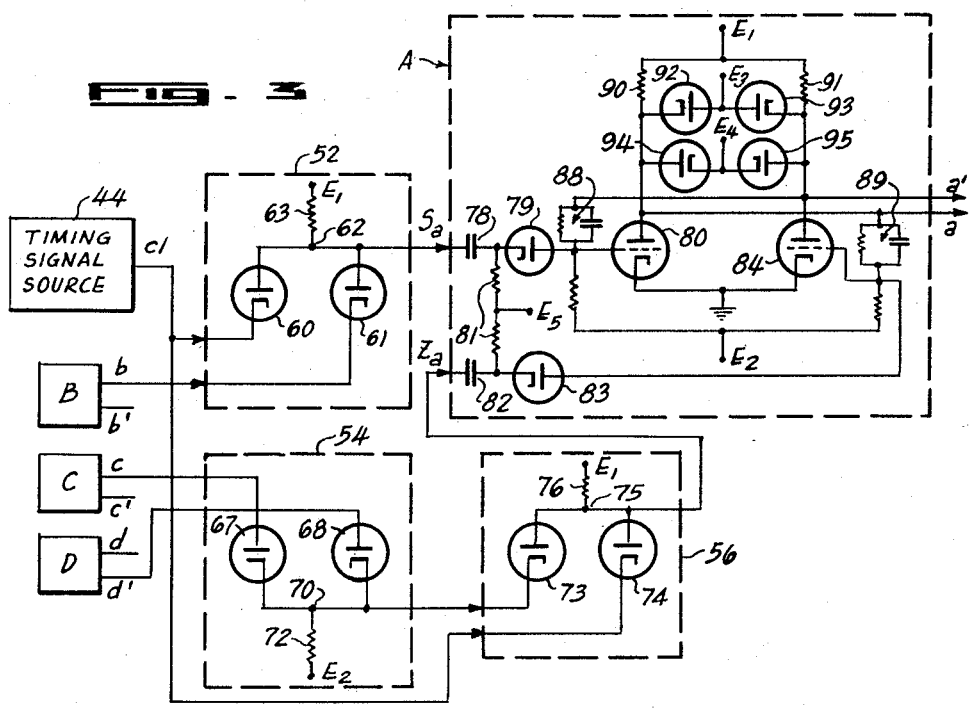
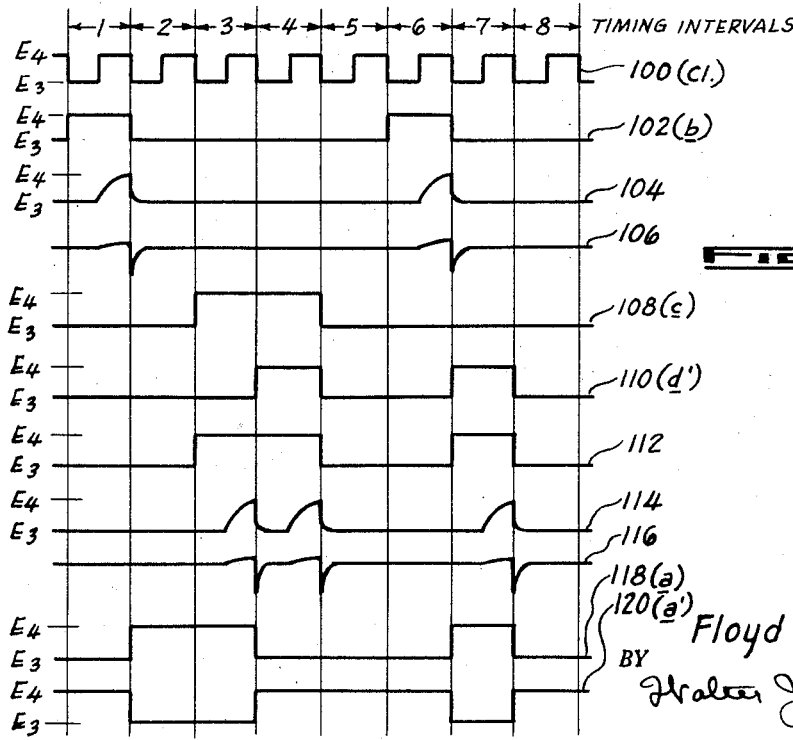

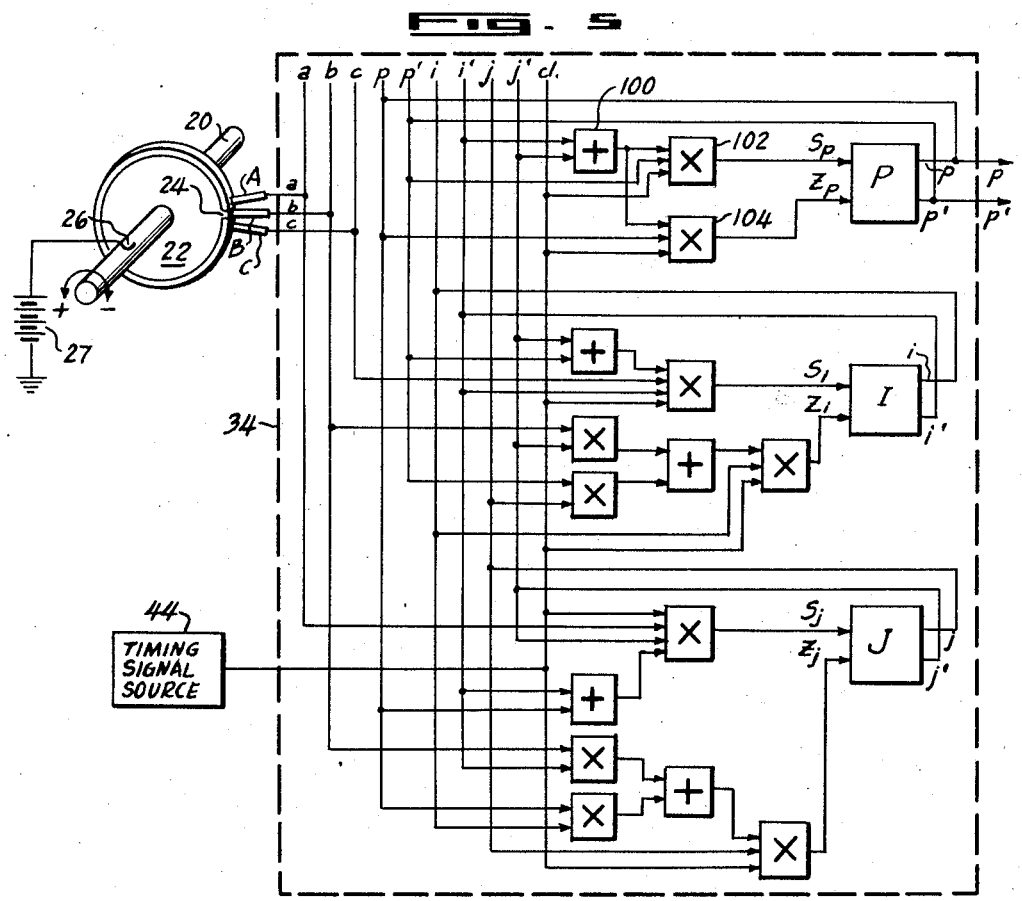
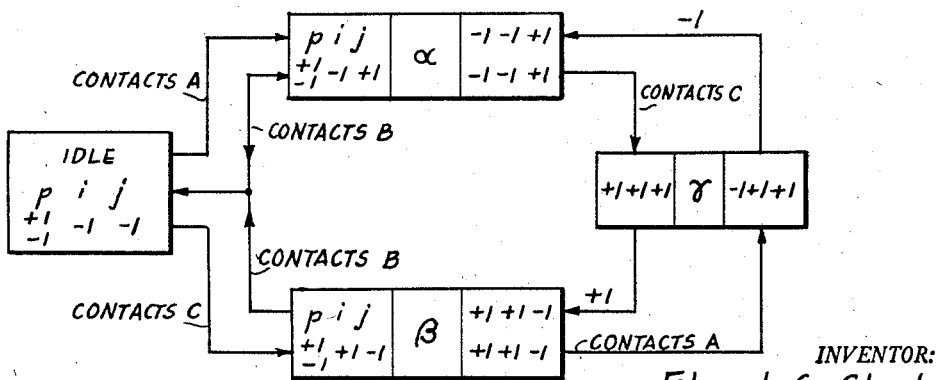

Aug. 4, 1959  F. G. STEELE  2,898,040
COMPUTER AND INDICATOR SYSTEM
Filed Sept. 26, 1952  6 Sheets-Sheet 5
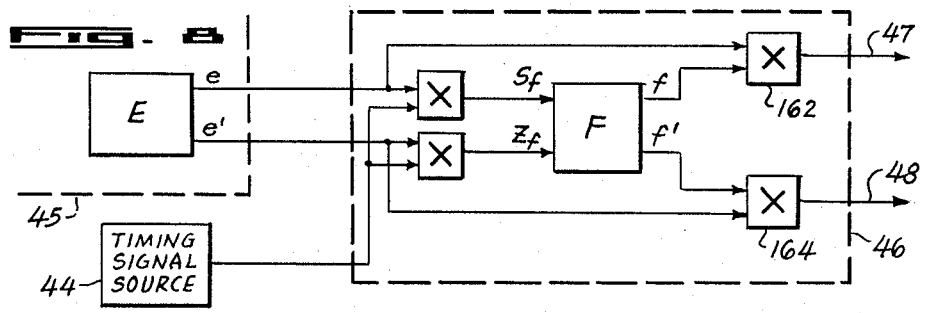
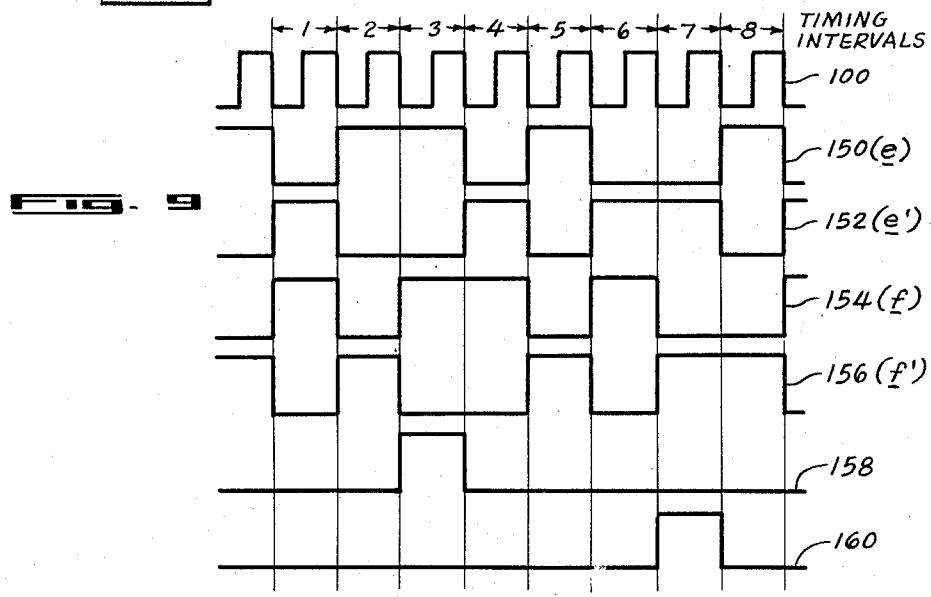
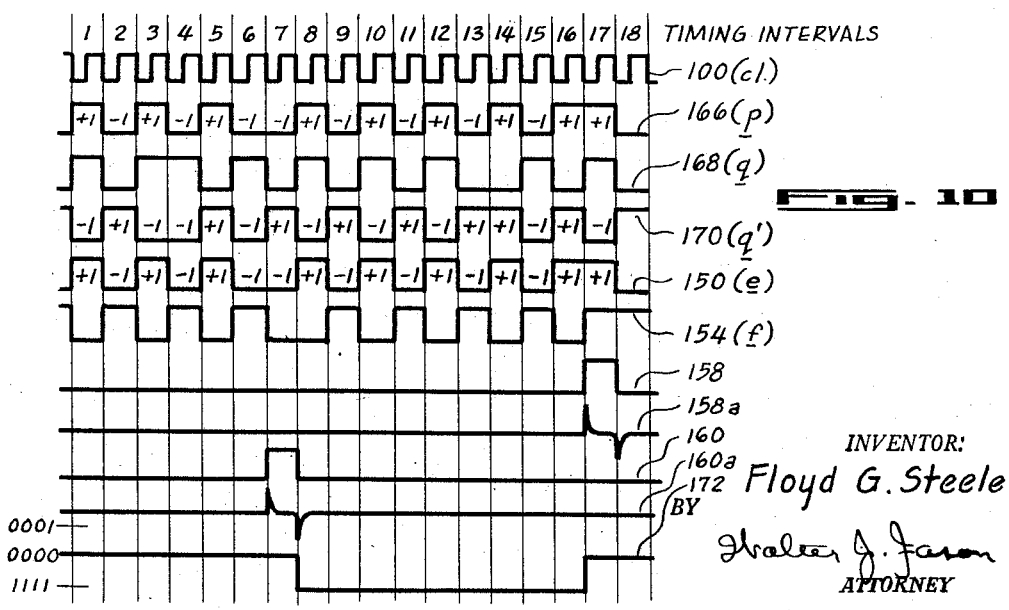
INVENTOR:
Floyd G. Steele
BY
Walter J. Jason
ATTORNEY Aug. 4, 1959  F. G. STEELE  2,898,040
COMPUTER AND INDICATOR SYSTEM
Filed Sept. 26, 1952  6 Sheets-Sheet 6
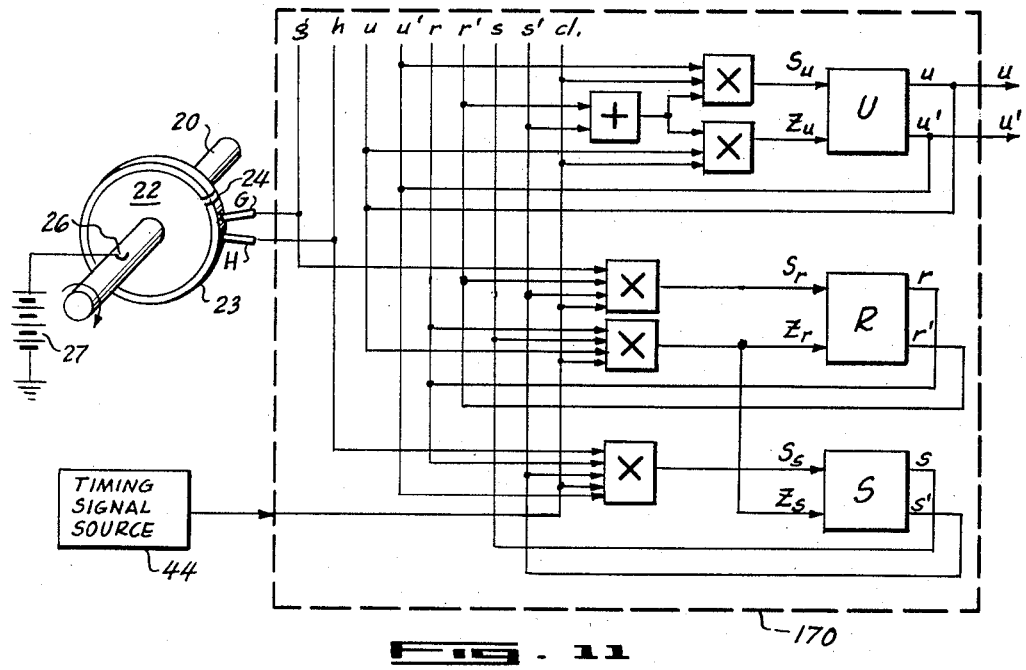
INVENTOR:
Floyd G. Steele
BY
ATTORNEY

United States Patent Office 2,898,040
Patented Aug. 4, 1959

2,898,040
COMPUTER AND INDICATOR SYSTEM

Floyd G. Steele, La Jolla, Calif., assignor to Digital Control Systems, Inc., a corporation of California Application September 26, 1952, Serial No. 311,609

39 Claims. (Cl. 235—151)

This invention relates to a displacement computer and indicator system, and more particularly, to a computer and indicator system using electrical signals in di-function form for computing and indicating the relative angular displacement between two rotating shafts.

Two principal types of electronic computers have been developed in the past. The earliest and most widely known is the analogue type in which computational information is generally represented as a magnitude; for example, as an analogue potential. When used for control purposes, for example, this information may relate to some function of a moving object, such as the displacement, velocity, etc., thereof. The computer continually compares this information analogue signal with a standard potential, the magnitude of the standard potential representing the precise displacement, velocity, etc. desired for the object. The comparison process, in turn, produces an error signal whose magnitude represents the divergence between the object's existing function and that desired for it, and is utilized by the computer to control the particular function of the object so as to maintain the error signal at a minimum value. With this accomplished, a close correlation is continuously maintained between the existing and the desired displacement, velocity, etc.

This analogue type of control may be readily effected, for an average control problem, without excessive circuitry. However, the basic difficulty arising in analogue systems is that of securing sufficient accuracy of control. As is well known, such accuracy is dependent not only upon continuous and uninterrupted operation of the computer components, but upon the inherent accuracy, under the best possible operating conditions, of these components, especially those associated with the potential standard. Attempts to increase this accuracy have resulted in extremely elaborate circuitry with the ensuing high cost, difficulty of servicing, and decreased reliability.

On the other hand, the other and more recent type of electronic computer has been that of numerical, and in particular, binary computers. In the binary type of computers, for example, information is represented electrically in the form of binary numbers and exact accuracy of each numerical computation is thus ensured owing to the precise nature of the mathematical operations involved. Also, since the information is represented in numerical form, great overall accuracy of control is obtainable since each piece of information may be represented to a very high degree of accuracy by forming each binary number corresponding thereto with a relatively large number of place digits.

A basic factor contributing to the recent advance of binary computers, other than the high degree of computational accuracy obtainable therein, is the fact that the binary digit values of 0 and 1 may be quite readily represented by the two output voltage levels of a bistable flip-flop. By employing such flip-flops in conjunction with "and" and "or" gating circuits, only these two output voltage levels need to be utilized in the entire computer system, and extremely complex associations between various gating circuits and groups of flip-flops may therefore be formed without undue difficulty. Also, owing to the numerical type of computation, the accuracy of the computational results will not be affected in any way by reasonable variations of these voltage levels. Thus, the potential standard, which contributes one of the limiting factors in the output accuracy of analogue computer systems, is completely unknown in binary computers.

Binary computers have several basic disadvantages which severely limit their practical applications. These limitations arise principally from the nature of the binary numbers employed to represent the information to be operated on. In the first place, the value of each binary number is determined by the value of its individual place digits. Each place digit of a binary number contributes, however, an entirely different value to the final overall value of the binary number than do any of the other place digits thereof. For example, the two's place digit has exactly twice the value in a binary number of the units place digit and in turn, has only one-half the value of the fours place digit of the same binary number.

Owing to this property of binary numbers, considerable circuitry must be provided in a computer system for merely "keeping track of" the binary digits in each number, since the interchange of any pair of place digits having opposite values will obviously cause considerable computational error. This is especially true in performing arithmetic operations between two binary numbers in which basic arithmetic operations must be performed only between corresponding place digits thereof.

Furthermore, since the higher place digits of a binary number have a greater relative value than do the low place digits thereof, any reversal of a single value thereof, owing to an intermittent component failure, for example, will produce inaccurate computational results. Also, since negative as well as positive binary numbers must be employed, additional circuitry is required to designate the sign of each binary number as well as of the binary numbers resulting from arithmetic operations performed by the computer between other binary numbers.

All of the above stated factors have, with other factors not mentioned, necessitated extremely complex and involved circuitry for even the most simple of binary computers. Such computers may involve, at the barest minimum, several hundred vacuum tubes, with thousands of associated diodes, resistors, capacitors, etc. Oftentimes the failure, either permanent or intermittent, of a single component will cause complete inaccuracy in the computational results. Thus, not only is the initial cost of such computers extremely high, but the servicing thereof, including the loss of operational time owing to such component failure, is likewise extremely high.

Another factor, inherent in representing information in binary number form which tends to limit the utility of binary computers for control applications, apart from the circuit complexity thereof, is the manner in which the information, forming the basis of the control, must be acquired. Some function such as displacement, velocity, etc. of a moving object to be controlled may be continuously indicated by a potential, a frequency, etc. However, the binary number representing the particular function, must be derived from the potential, frequency, etc. at a given instant of time and hence only represents the function at that instant of time. The resultant binary number is in turn processed by the computer and the computer's output signal, representing a binary number, is transformed into a corresponding control signal, which in turn, is used for controlling the object. This control process is then repeated at a later instant of time by again deriving a binary number representing the object's new velocity, displacement, etc. and repeating the computation and control processes. In this way, the object is controlled at discrete, spaced instants of time in accordance with binary numbers also derived from it at discrete, spaced instants of time.

The control is thus only intermittent in nature, that is, between the instants of deriving binary numbers, the computer has no means of determining the actual operation of the object under control. Thus, any change of control to be applied to the object, must necessarily be delayed until after the next computational operation with the result that appreciable errors may exist in the function of the controlled object before correction can be applied thereto. Often, excessive computational speeds must be employed in order to shorten the interval between information samplings.

The device according to the present invention transforms information into a radically new and different non-numerical electrical form suitable for new types of computational and control processes. The character of this non-numerical form of information is capable of, when considered for computational control purposes, alleviating a majority of the disadvantages existent in digital and analogue computers as noted above while yet retaining the inherent simplicity of analogue computers and the inherent accuracy of binary computers. In particular, this non-numerical type of information is represented by an electrical signal in, as defined, di-function form. A signal in di-function form or, as is later designated, a di-function signal, comprises a series of alternate high and low voltage levels of the type produced by flip-flops, for example, each of the voltage levels appearing for an integral number of timing intervals, the timing intervals being electrically indicated by a clocking or timing signal.

A high voltage level appearing for one timing interval represents, by definition, an instantaneous di-function value of +1 and a low voltage level appearing for an interval represents an instantaneous di-function value of −1. The ordinary or average value represented by a di-function signal, as contrasted with an instantaneous value, must be considered over an integral number of consecutive timing intervals during a period of time, and is defined as the ratio between the number of timing intervals during the period that the signal is at its +1 value minus the number that the signal is at its −1 value to the total number of timing intervals during the period.

This definition may be represented most conveniently in mathematical form by the equation:

$$V_{\not{D}} = \frac{N_+ - N_-}{N_+ + N_-}$$

where:

$N_+$ is the number of timing intervals during the period that the difunction signal is at its high voltage level or +1 value;

$N_-$ is the number of timing intervals during the period that the di-function signal is at its low voltage level or −1 value;

$N_+ + N_-$ is the total number of timing intervals of the period; and $V_{\not{D}}$ is the average represented by the di-function signal during the given period of time.

As is apparent, the value of a di-function signal will vary in accordance with the length of the timing period over which it is considered, and the accuracy with which any given piece of information may be represented in di-function form will, in general, be proportional to the number of timing intervals used to represent it.

In considering further the character of information expressed in di-function signal form, it is apparent that both positive and negative values may be readily represented by generating a greater or less number, respectively, of +1 values than are −1 values. Also, the di-function value of zero is readily available in the form of alternate instantaneous +1 and −1 values appearing during consecutive timing intervals. This latter concept of a zero valued di-function signal is a fundamental one which is used extensively by the system of the present invention.

In considering now, the fundamental difference in representing information in di-function form and in binary number form, as particularly directed toward computational control problems, it is apparent that any given instantaneous di-function value of a signal will contribute the same relative value to the average of the signal, as considered over a period of time, as will any other instantaneous di-function value occurring during the same period. Hence, no particular order of +1 and −1 values need be observed in a di-function signal in order to have it represent any desired piece of information. The only requirement that must be observed is that a correct relationship between the relative number of each is obtained so that the desired average be had. Furthermore, any inaccuracy of a single instantaneous di-function value, owing to an intermittent component failure, for example, will cause only a slight error in the final di-function value considered over a period of time and will hence, not lead to overwhelmingly inaccurate computational results.

Another important fundamental difference between di-function and binary information lies in the fact that the value of a di-function signal, representing some function of a moving object, for example, will respond instantaneously to changes in magnitude of the object's function. This is accomplished by generating a greater relative number of either instantaneous +1 values or instantaneous −1 values, respectively, as determined by the initial relationships set forth between the function's magnitude and the value of the di-function signal.

Although the computer and indicator system of the present invention is closely related to, but not specifically concerned with computational control problems, the circuitry and operation of its components will enable one skilled in the art to readily appreciate other advantages not specifically set forth here of di-function over binary information. In particular, the computer and indicator system of the present invention includes a component for generating a di-function signal, a component for performing an arithmetic operation on a pair of di-function signals, a component for deconverting the information contained in a di-function signal into information in pulse form, and a component for counting the resultant pulses. Additional properties of di-function signal information will be apparent in the specific descriptions directed to the above noted components as set forth later in this disclosure.

More particularly, the computer and indicator system of the present invention includes first and second identical di-function bi-directional angular quantizers responsive to first and second variables, which are for the purposes of the explanation of this invention, first and second rotating shafts, respectively. Each quantizer normally produces a di-function output signal having an average value of zero, that is, alternate +1 and −1 instantaneous di-function values. However, each quantizer, upon each predetermined magnitude of rotation of its respective shaft in a designated positive direction, generates an extra +1 value in its output di-function signal, that is a +1 value appearing for two consecutive timing intervals. On the other hand, each quantizer produces an extra −1 value in its output signal, that is, a −1 value appearing for two consecutive timing intervals upon each corresponding magnitude of rotation of its respective shaft in its opposite or designated negative direction.

The next component included in the system is a di-function parallel half-adder or averager, hereafter termed half-adder, which normally receives two input di-function signals and produces an output di-function signal the value of which is one-half the value of its two input signals. Although the half-adder is derived by considering it as a half-adder, the arithmetic process of di-function subtraction is required in the computer and indicator system and is readily obtained by the simple expedient of adding the first quantizer's output signal to the second quantizer's complementary output signal. The average value of the adder's di-function output signal thus represents the difference between the average values of the two input di-function signals and, in a manner similar to its pair of input signals, normally contains alternate +1 and —1 values representing the di-function value of zero. However, upon the appearance of a pair of extra +1 values or extra —1 values in either of its input signals, only one extra +1 or —1 value, as the case may be, is generated by the half-adder in its output signal owing to its averaging properties.

The output signal from the half-adder component is applied to a deconverter, the deconverter acting to produce a signal on one of its two output conductors each instance the half-adder's output signal contains an extra +1 value and a signal on its other output conductor each instance the adder's output signal contains an extra —1 value.

The two output conductors of the deconverter are coupled through two differentiating circuits, respectively, to two input terminals of a conventional binary up-down counter. The counter responds to pulses appearing on one of its input terminals for counting up in binary digit steps of one and responds to pulses appearing on its other input terminal for counting down in binary digit steps of one. The magnitude of the count indicated by the counter numerically represents the difference in the angular displacement between the first and second shafts and the sign of the count indicates the direction of this displacement.

In addition to the bi-directional quantizer illustrated, there is also set forth a uni-directional di-function angular quantizer for converting the rotation of a shaft, rotatable in one direction, into a corresponding di-function signal. This latter signal contains extra +1 di-function values for each predetermined amount of shaft rotation.

It is therefore, the principal object of the present invention to provide a system for computing and indicating the relative angular displacement between two rotating shafts.

Another object of the present invention is to provide a device for computing and indicating the relative movement between two movable members.

A further object of the present invention is to provide a device for computing and indicating the magnitude and direction of displacement between two moving members, each of the members having movement in two directions.

A still further object of the present invention is to provide a device utilizing signal information in di-function form for numerically indicating the magnitude and direction of movement between two movable members, each of the members having movement in two directions.

Another object of the present invention is to provide a device for producing a di-function signal, the value of which represents the difference in movement between two movable members, and numerically indicating the value of the di-function signal.

Another object of the present invention is to provide a device for computing and indicating the relative angular displacement between two rotating shafts, each of the shafts being rotatable in two directions, by electrical signals in di-function form.

Another object of the present invention is to provide a device for producing an output signal in di-function form, the value of which represents the movement of a movable member.

A further object of the present invention is to provide a quantizer for use with a movable member, said quantizer producing a di-function signal the value of which represents over a given period of time the displacement of the movable member during the period of time.

Still another object of the present invention is to provide a quantizer for use with a member having two directions of movement, said quantizer producing an output di-function signal the value and sign of the value of which represent the magnitude and direction, respectively, of the movement of the movable member.

A further object of the present invention is to provide a quantizer for indicating the direction and magnitude of movement of a movable member having two paths of movement by a pair of complementary di-function signals.

Another object of the present invention is to provide a device for use with a movable member, said device normally producing alternate high and low output voltage levels during consecutive timing intervals but responsive to each predetermined magnitude of movement of the member for producing one of said output voltage levels for two consecutive timing intervals.

Still another object of the invention is to provide a device for use with a movable member having first and second directions of movement, said device producing alternate high and low voltage levels during consecutive timing intervals but responsive to a predetermined magnitude of movement of the movable member in said first and second directions for producing said high and low voltage levels, respectively, for two consecutive timing intervals.

A further object of the present invention is to provide a device for averaging the values of a pair of di-function signals.

A still further object of the present invention is to provide a device for adding a first di-function signal to a second di-function signal and producing a third di-function signal whose di-function value is one-half the sum of the di-function values of the first and second signals.

Still another object of the present invention is to provide a parallel di-function half-adder for producing an output di-function signal whose value is the average of two input di-function signals.

Another object of the present invention is to provide a device for producing a high output voltage level in response to the simultaneous appearance of a high voltage level in each of two input signals and a low voltage level in response to the simultaneous appearance of a low voltage level in each of the two input signals, and alternate high and low voltage levels in response to the simultaneous appearance of different voltage levels in the two input signals.

Still another object of the present invention is to provide a device for producing an output di-function signal representing one-half the difference in di-function values of a pair of input signals.

A further object of the present invention is to provide a device for adding a first di-function signal to the complementary signal of a second di-function signal to produce an output di-function signal whose value is a function of the difference in values between the first and second di-function signals.

Still another object of the present invention is to provide a device for converting the information contained in a di-function signal into pulse form.

Another object of the present invention is to provide a device for producing a first output signal whenever an input di-function signal contains two consecutive high voltage levels and a second output signal whenever the di-function signal contains two consecutive low voltage levels.

A further object of the present invention is to provide a device for delaying a di-function signal for one time ing interval and for producing first and second output signals whenever the di-function signal and the delayed di-function signal are simultaneously at their +1 and —1 values, respectively.

Other objects and features of the present invention will be readily apparent to those skilled in the art from the following specification and appended drawings wherein is illustrated a preferred form of the invention, and in which:

Fig. 1 is a block schematic diagram of the computer and indicator system according to the present invention;

Fig. 2 is a block schematic diagram of an electrical circuit employed to illustrate the principles involved in illustrating the devices of the present invention;

Fig. 3 is a detailed circuit diagram of the block schematic diagram of Fig. 2;

Fig. 4 is a composite group of signal waveforms representing the operation of the circuit of Fig. 3;

Fig. 5 is a block schematic diagram of a bi-directional di-function quantizer according to the present invention;

Fig. 6 is a block diagram illustrating the programming of the quantizer according to Fig. 5;

Fig. 8 is a block schematic diagram of the deconverter according to the present invention;

Fig. 9 is a composite group of signal waveforms illustrating the principle of operation of the deconverter of Fig. 8;

Fig. 10 is a composite group of signal waveforms illustrating the principles of operation of the computer and indicator system of Fig. 1; and Fig. 11 is a block schematic diagram of a uni-directional di-function quantizer according to the present invention.

Figure 7A:
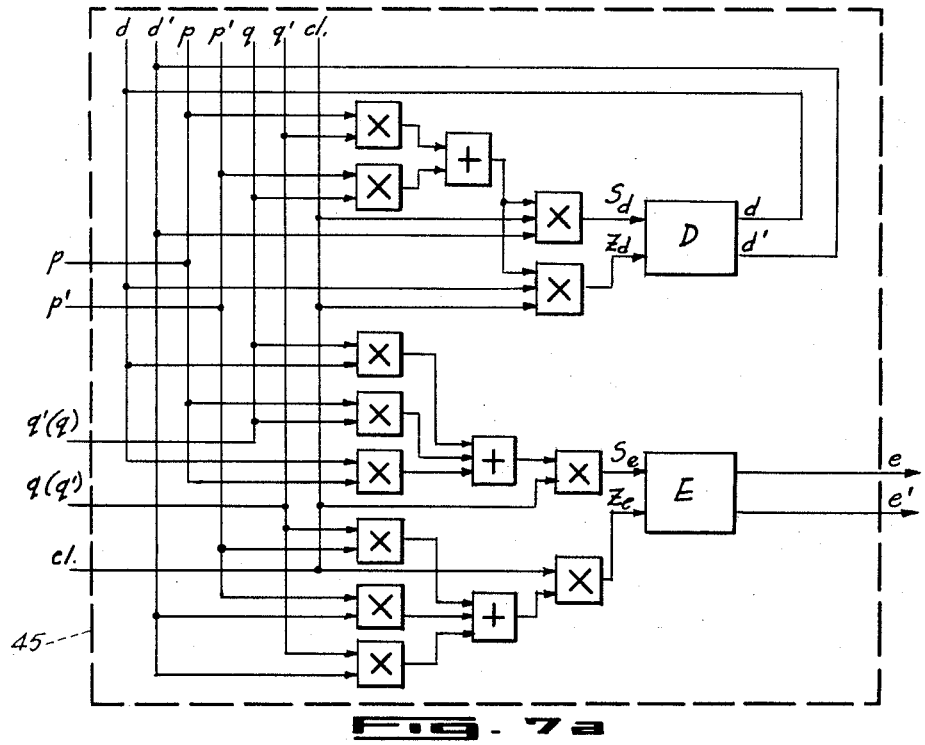
Figs. 7a and 7b are a pair of block schematic diagrams of two forms of di-function half-adder circuits according to the present invention.

Referring now to the drawings wherein identical elements are given the same numerical designation, there is illustrated in Fig. 1, the computer and indicator system according to the present invention for producing a binary number count representing the angular displacement between two rotating shafts. The first rotating shaft 20, formed of electrically conductive material, has a disc 22 affixed thereto. Disc 22 is also formed of electrically conductive material with the exception of a non-conducting or insulated ring or segment 23 extending around a major portion of the periphery thereof. A commutator segment 24 is formed between the ends of insulated segment 23 and provides a narrow conductive arm or commutator segment extending to and lying along the periphery of the disc.

A spring loop 26, in conductive contact with shaft 20, is connected to the positive terminal of a source of potential, such as battery 27, the negative terminal of battery 27 being connected to ground. Disc 22 is contacted at its periphery by three brushes A, B and C which are, in turn, conductively coupled to three of the input terminals, respectively, of a first di-function quantizer 34. A detailed description of the circuitry and mode of operation of quantizer 34 will later be presented in connection with Figures 5 and 6 of this disclosure.

The second rotating shaft 36 has a disc 37 affixed thereto, disc 37 being similar in all respects to disc 22. Shaft 36 is also contacted by a spring loop 39, similar to loop 26, loop 39 being also connected to the positive terminal of battery 27. The periphery of disc 37 is contacted by three parallel brushes, L, M and N, similar to brushes A, B and C, respectively, which are connected to three of the input terminals of a di-function quantizer 42, similar to quantizer 34.

The output terminal of a source 44 of timing signals, designated cl, is connected to a final input terminal of each of quantizers 34 and 42 while the pair of complementary output signals, designated p and p', of quantizer 34 are applied to two of the input terminals of a di-function serial half-adder or averager 45. The pair of complementary output signals, designated q and q', of quantizer 42 are applied to two additional input terminals of adder 45 while the timing signal of source 44 is applied to a final input terminal of adder 45.

Timing signal source 44 produces a repetitive output signal waveform of alternate low and high voltage levels, and may, for example, comprise any conventional square wave generator or multivibrator circuit. A detailed description of the circuitry and operation of half-adder 45 will be later presented in connection with Fig. 7 of this disclosure.

The pair of complementary output signals, designated e and e', of adder 45 are applied to two of the input terminals of a di-function deconverter 46 while timing signal cl is applied to a third input terminal thereof. A detailed description of the circuitry and mode of operation of deconverter 46 is later found in connection with Figures 8 and 9 of this disclosure.

The two output conductors 47 and 48 of deconverter 46 are connected through differentiating circuits 47a and 48a, respectively, to the two input terminals of an up-down counter 49. Counter 49 may be of any conventional binary type having two input conductors which increases its count one binary digit in response to a signal applied to one input conductor and decreases its count one binary digit in response to a signal applied to its other input conductor. Such a counter is illustrated and described in an article entitled "A Binary Quantizer" by Kay Barney, appearing on pages 963 and 964 of the November 1949 issue of the magazine Electrical Engineering. The particular counter therein disclosed increases and decreases its count in response to positive and negative pulses, respectively.

In order that the system of Fig. 1 may operate properly, certain relationships should exist between various physical and electrical parameters thereof. First of all, the frequency of the timing signal cl must be sufficiently high relative to the maximum angular velocity attained by shafts 20 and 36 such that two timing intervals will be generated during any given contact between their respective commutator segment and any one of their respective brushes.

Also, the thickness of any of the brushes, A, B or C should be so related to the width of segment 24, as measured along the periphery of disc 22, that only one brush will contact segment 24 at any given instant.

A detailed account of the operation of the entire system of Fig. 1 will be set forth in connection with Fig. 10 after the circuitry and principles of operation of quantizers 34 and 42, adder 45, and deconverter 46, here indicated only in block diagrammatic form, have been presented. In brief, it may be stated that each of quantizers 34 and 42 produces a pair of complementary output signals in average form, the di-function values of which indicate, for any given interval of time, both the magnitude and direction of the angular velocity, with respect to a predetermined maximum velocity, of its associated shaft. The counter-clockwise direction of rotation of shafts 20 and 36, it should be here noted, is taken to be positive with the clockwise direction of rotation being taken as negative.

Adder 45 then adds the di-function output signal of quantizer 34 to the inverted or complementary di-function output signal of quantizer 42 to produce an output di-function signal whose average value represents the difference in average values between the two output signals from quantizers 34 and 42. Stated differently, adder 45, owing to the manner in which the input signals from quantizers 34 and 42 are applied thereto, produces an output di-function signal the average value of which represents the subtracted result of the di-function output signal of quantizer 42 from the di-function output signal of quantizer 34.

The average value of the di-function output signal from adder 45, taken over a given interval of time, in turn, indicates the magnitude of the difference in angular displacement between shafts 20 and 36 for this interval of time and the sign of this value indicates the direction of this relative displacement.

Deconverter 46 changes the information contained in the di-function output signal of adder 45 into information in a voltage level or pulse type of form as it appears on its output conductors 47 and 48. In particular, if the output signal of adder 45 has an average value of zero, as represented by a series of alternate +1 and —1 instantaneous di-function values, then deconverter 46 does not produce an output signal on either of its output conductors. However, if an extra +1 instantaneous di-function value is contained in the adder ouput signal, then deconverter 46 produces a high output voltage level lasting for one timing interval on conductor 47. If, on the other hand, the adder output signal contains an extra —1 value, then deconverter 46 produces a high output voltage level lasting for one timing interval on conductor 48.

Differentiating circuit 47a differentiates the leading and trailing edges of all output voltage levels appearing on conductor 47 into positive and negative pulses, respectively, the positive pulses being effective to operate counter 49, as described in the before referred to article, into increasing its count one binary digit value. Differentiating circuit 48a, likewise produces positive and negative pulses for each voltage level appearing on conductor 48, each negative pulse thereof being effective to operate counter 49 into decreasing its binary count by one binary digit value.

If the binary number count of counter 49 is positive, it indicates that shaft 20 has made an overall counter-clockwise displacement relative to shaft 36 during the period of the count. If the count is negative, it indicates an overall clockwise displacement of shaft 20 relative to shaft 36. If, during a short period of time, the count is increasing, it indicates that the rotation of shaft 20 relative to shaft 36 during that period is in a positive or counter-clockwise direction. If this count is decreasing, it indicates that the rotation of shaft 20 relative to shaft 36 during that period is in a negative or clockwise direction.

Quantizers 34 and 42, adder 45 and deconverter 46 each comprise intricate combinations of "and" gating circuits, "or" gating circuits, and flip-flops, each combination being an electrical realization or mechanization of a mathematical equation in Boolean form. Since the basic principles involved in mechanizing all Boolean expressions are identical, the mechanization of a pair of simple equations is illustrated in Figures 2 and 3 so that the principles involved in this example, once understood may be readily applied to more complex equations of the type defining the quantizers, adders and deconverter.

The mechanization illustrated in Figures 2 and 3 is of the two Boolean equations:

$$S_a = b \cdot cl \quad \text{(Eq. 1)}$$
$$Z_a = (c + d') \cdot cl \quad \text{(Eq. 2)}$$

In particular, in Fig. 2, there is illustrated the mechanization of Equations 1 and 2 into a schematic representation in which each of the "and" and "or" gating circuits and the flip-flop is set forth as an individual block. Thus, in Fig. 2, timing signal source 44 produces a timing or clocking signal, designated $cl$, on its output conductor. A flip-flop B produces on its two output conductors, two complementary output signals, $b$ and $b'$, respectively, while a flip-flop C produces complementary output signals $c$ and $c'$ on its two output conductors, respectively. Also, a flip-flop D produces complementary output signals $d$ and $d'$ on its two output conductors, respectively. Each of the pairs of complementary signals, $b$ and $b'$, $c$ and $c'$, and $d$ and $d'$ comprise complementary alternate high and low voltage levels, each of the voltage levels appearing for an integral number of timing intervals as clocked by signal $cl$.

Flip-flop A includes a pair of input conductors, designated $S_a$ and $Z_a$, respectively, and produces two complementary output signals $a$ and $a'$ on its two output conductors, respectively. The $S_a$, or "Set $a$," input conductor of flip-flop A denotes that flip-flop A will be triggered into its "set" state by any signal applied thereto such that output signal $a$ will be at its high voltage level. Since, by definition, the high voltage level is equal to an instantaneous di-function value of +1, a signal applied to the $S_a$ input terminal will trigger flip-flop A so that signal $a$ will equal +1. When this is done, complementary signal $a'$ will be at its low voltage level and hence, equal to an instantaneous di-function value of —1.

The $Z_a$, or "Zero $a$," input conductor denotes that flip-flop A will be triggered by any signal applied thereto into its "zeroed" state in which signal $a$ is at its low voltage level and hence, equal to an instantaneous di-function value of —1. When this is done, signal $a'$ will be at its high voltage level and hence, equal to an instantaneous di-function value of +1.

As will be brought forth later in connection with Fig. 3, flip-flop A is of the bistable type having two stable states. Thus, once the value of signal $a$ is made equal to +1 by a signal applied to conductor $S_a$, it will remain at that value until another signal is applied to $Z_a$ input conductor at which time it will change to the —1 value.

Equation 1, for $S_a$, denotes that an input pulse is to be applied to the $S_a$ input conductor each instance signals $cl$ and $b$ are simultaneously at their high voltage level. Stated differently, Equation 1 defines that signal $S_a$ is high whenever signal $b$ is high "and" signal $cl$ is high. As is well understood by those skilled in the computer art, the logical operation defined by this Boolean equation may be readily mechanized by a well-known "and" gating circuit which receives the input signals $b$ and $cl$ and produces the output $S_a$. In particular the logical operation defined by Equation 1 is accomplished by connecting the two input terminals of a two terminal "and" gating circuit 52 to the output conductor of source 44 and the $b$ signal output conductor of flip-flop B, respectively. The output conductor of circuit 52, on which appears the logical product $b \cdot cl$ signal, is connected to input conductor $S_a$. "And" gating circuit 52 is illustrated by a block having X therein, the X representing that its output signal is the logical product or "and" function of the input signals applied thereto.

Equation 2 for $Z_a$ denotes that an input signal is to be applied to the $Z_a$ input conductor to make $a = -1$ each instance either of signals $c$ or $d'$ is at its high voltage level at the identical time signal $cl$ is at its high voltage level. Stated differently, Equation 2 defines that signal $Z_a$ is high whenever signal $c$ is high "or" signal $d'$ is high "and" signal $cl$ is high. As is well understood by those skilled in the art, this equation defines two logical operations, namely an "or" operation as defined by the + sign and an "and" operation as defined by the · sign, which can readily be mechanized by well-known "or" and "and" gating circuits, respectively. In particular, the equation is mechanized by connecting the $c$ and $d'$ signal output conductors of flip-flops C and D, respectively, to the two input terminals of a two terminal "or" gating circuit 54, respectively, and then connecting the output conductor of circuit 54 and signal source 44 to the two input terminals, respectively, of a two terminal "and" gating circuit 56, similar to circuit 52. The output conductor of circuit 56 is, in turn, connected to input conductor $Z_a$. "Or" gating circuit 54 is illustrated by a block having a + sign therein, the + representing that its output signal is the logical sum or "or" function of the input signals applied thereto.

In order that the exact operation of the circuit of Fig. 2 may be understood, a detailed structural embodiment thereof is set forth in Fig. 3. This detailed embodiment is intended to illustrate the basic operational principles involved upon the application of input signals to "and" and "or" gating circuits, and their resulting operations in connection with a flip-flop. With these principles established, the operation of the more complex circuits as set forth later in block diagram form of the quantizer, adder, etc., may be readily understood.

In particular, the output conductor of source 44 is connected to the cathode of a diode 60 within "and" gating circuit 52 while the $b$ signal output conductor of flip-flop B is connected to the cathode of a diode 61 also within circuit 52. The anodes of diode 60 and 61 are connected together at a common junction 62, junction 62 being connected to the positive terminal $E_1$ of a source of potential (not shown) through a resistor 63. Junction 62 is, in turn, connected to the $S_a$ input conductor of flip-flop A.

The $c$ signal output conductor of flip-flop C is connected to the anode of a diode 67 within "or" gating circuit 54 while the $d'$ signal output conductor of flip-flop D is connected to the anode of a diode 68 also within circuit 54. The cathodes of diodes 67 and 68 are connected together at a common junction 70, junction 70 being connected through a resistor 72 to the negative terminal $E_2$ of a source of potential (not shown).

Common junction 70 is connected to the cathode of a diode 73 within "and" gating circuit 56 while the output conductor of source 44 is connected to the cathode of a diode 74 also within circuit 56. The anodes of diodes 73 and 74 are connected to a common junction 75, junction 75 being connected through a resistor 76 to terminal $E_1$. Common junction 75 is, in turn, connected to the $Z_a$ input conductor of flip-flop A.

Considering now the circuitry of flip-flop A, the $S_a$ input conductor thereof is connected to one plate of a capacitor 78, the other plate of capacitor 78 being connected to the cathode of a diode 79. The anode of diode 79 is connected to the grid of a first triode 80. The $Z_a$ input conductor is connected serially through a capacitor 82 and a diode 83 to the grid of a second triode 84. The cathodes of diodes 79 and 83 are connected through a pair of resistors indicated at 81 to the positive terminal $E_5$ of a source of potential (not shown).

The cathodes of triodes 80 and 84 are connected to ground while their grids are connected through respective grid resistors to negative terminal $E_2$. The anode of triode 84 is connected through a paralleled resistor-capacitor combination 88 to the grid of triode 80 while the anode of triode 80 is connected through a paralleled resistor-capacitor combination 89 to the grid of triode 84.

The anodes of triodes 80 and 84 are connected through plate resistors 90 and 91, respectively, to terminal $E_1$. The anode of triode 80 is also connected to the cathode of a clamping diode 92, the anode of diode 92 being connected to the positive terminal $E_3$ of another source of potential (not shown). The cathode of another clamping diode 93 is connected to the anode of triode 84, the anode of diode 93 being connected to terminal $E_3$. The anode of still another clamping diode 94 is connected to the anode of triode 80, its cathode being connected to the positive terminal $E_4$ of still another source of potential (not shown). The cathode of yet another clamping diode 95 is connected to terminal $E_4$, its anode being connected to the anode of triode 84.

The magnitude of the potential appearing on the terminals $E_1$, $E_2$, $E_3$, $E_4$ and $E_5$ may, for example, have the values of $+250$ v., $-250$ v., $+100$ v., $+140$ v., and $+5$ v., respectively. As is apparent, the small positive potential from terminal $E_5$ is applied to bias the cathodes of diodes 79 and 83. The $a$ signal output conductor of flip-flop A is connected to the anode of triode 80, while the $a'$ signal output conductor is connected to the anode of triode 84.

The operation of the circuitry of Fig. 3 may be most readily understood by reference to the composite diagram of signal waveforms appearing at various points in the circuit of Fig. 3 as are illustrated in Fig. 4. The output signal, generally designated 100 in Fig. 4, of timing signal source 44, comprises a series of alternate low and high voltage levels, defining a series of designated timing intervals. As indicated, the voltages of the high and low voltage levels of signal 100 are equal to the voltages appearing on terminals $E_4$ and $E_3$, respectively. Also, the high and low levels are illustrated as being substantially equal in duration. However, as will be later recognized, other similar types of waveforms may be utilized for clocking purposes, for example, those produced by blocking oscillators.

The signal, generally designated 102 in Fig. 4, is output signal $b$ and is, for the purposes of this example, at its high voltage level during the first and sixth timing intervals, and at its low voltage level during the remaining timing intervals. The signal, generally designated 108 in Fig. 4, is output signal $c$ and is, for this example, at its high voltage level during the third and fourth timing intervals while the signal, generally designated 110 in Fig. 4, is output signal $d'$ and is at its high voltage level during the fourth and seventh timing intervals. The high and low voltage levels of each of signals 102, 108 and 110 are equal to the voltages appearing on terminals $E_4$ and $E_3$, respectively.

During the first half of the first timing interval, timing signal 100 is at its low voltage level, while signal 102 is at its high voltage level. Thus, the potential of the signal, generally designated 104 in Fig. 4, appearing on common junction 62 of "and" gating circuit 52 is at the low voltage level $E_3$ owing to the direction of connection of diodes 60 and 61. During the second half of this first timing interval, signal 100 switches to its high voltage level, and signal 104 rises exponentially to the high voltage level $E_4$ by reason of capacitor 78, within flip-flop A, being slowly charged from terminal $E_1$ through the relatively high resistance of resistor 63. The values of capacitor 78 and resistor 63 should be so related as to have the charging of capacitor 78 substantially completed by the end of this timing interval.

At the beginning of the second timing interval, signal 100 switches to its low voltage level $E_3$ with the result that capacitor 78 is discharged to that voltage level, the discharge taking place through its associated resistor 81, whose value is relatively low in comparison with the resistance of resistor 63, hence allowing a relatively quick discharge of capacitor 78 therethrough. This quick discharge through resistor 81, in turn, produces a sharp negative pulse thereacross, which negative pulse, after conduction through diode 79, appears on the grid of triode 80. The signal, generally designated 106 in Fig. 4, appearing on the grid of triode 80 illustrates this pulse as it appears at the beginning of the second timing interval.

It is assumed that, for the first timing interval, triode 80 was fully conducting and hence, output signal $a$, generally designated 118 in Fig. 4, was at its low voltage level. The pulse in signal 106, appearing at the beginning of the second timing interval, lowers the potential on the grid of triode 80 such that triode 80 becomes non-conducting with a corresponding rise of its anode potential. This rise is, in turn, coupled to the grid of triode 84 through resistor-capacitance combination 89 so that triode 84 begins conduction. This, in turn, results in signal $a'$, generally designated 120 in Fig. 4, appearing on the anode of triode 84 changing from its high voltage level of the first timing interval to its low voltage level during the second timing interval.

In considering the action of the clamping diodes 92 and 94, it should first be stated that the particular relationship existing between the potential appearing on terminal $E_1$, the resistance of resistor 90 and the tube characteristic of triode 80 are such that the normal high and low voltage levels appearing on the anode of triode 80 are greater and less than, respectively, the potentials appearing on terminals $E_4$ and $E_3$, respectively. Thus, with triode 80 non-conducting, its high voltage level will be lowered to the potential appearing on terminal $E_4$ owing to the shunting action of diode 94. On the other hand, with triode 80 conducting, its low voltage level will be raised to the potential appearing on terminal $E_3$ owing, in this case, to the shunting action of diode 92. Since this same effect is applied to the high and low voltage levels appearing on the anode of triode 84 by diodes 95 and 93, respectively, it is seen that the complementary signals $a$ and $a'$ will always be at either the $E_3$ and $E_4$ potentials, respectively, or at the $E_4$ and $E_3$ potentials, respectively.

Summarizing the circuit operation thus far presented, it is seen that when the voltage levels appearing on the two input conductors to "and" gating circuit 52 are both high during a timing interval, the signal applied thereby to the $S_a$ input conductor produces a change in the conduction state of flip-flop A such that signal $a$ changes from its low to high voltage level, or expressed in di-function terms, changes from a $-1$ to a $+1$ value during the next timing interval. As is readily apparent, any additional negative pulses applied to the grid of triode 80 from circuit 52 and capacitor 78 will have no effect on the conduction state of flip-flop A, owing to the cut-off condition of triode 80.

Signal 108 is at its high voltage level during the third timing interval, with the result that the signal, generally designated 112 in Fig. 4, appearing on common junction 70 of "or" gating circuit 54, will, owing to the direction of connection of diodes 67 and 68, be likewise at the high voltage level. Signal 112 is applied to "and" gating circuit 56 along with signal 100 with the result that the potential of the signal, generally designated 114 in Fig. 4, appearing on junction 75 of circuit 56 will rise exponentially to the high voltage level $E_4$ during the last half of this third timing interval. This potential rise is due to the charging up of capacitor 82 of flip-flop A from the $E_1$ terminal through resistor 76.

Upon signal 100 switching to its low voltage level at the beginning of the fourth timing interval, capacitor 82 discharges rapidly through its associated resistor 81, terminal $E_5$ to ground, with the result that a negative pulse is produced across this resistor 81 at the beginning of the fourth timing interval. This pulse, after conduction through diode 83 appears in the signal, generally designated 116 in Fig. 4, applied to the grid of the then-conducting triode 84. Triode 84 is rendered non-conducting thereby with its resulting anode potential rise being coupled through resistor-capacitor combination 88 to the grid of triode 80 to thereby cause triode 80 to begin conduction. Thus, signals 118 and 120 switch to the low and high voltage levels, respectively, at the begining of the fourth timing interval to indicate, in di-function terms $a=-1$ and $a'=+1$. It is thus seen that when either of signals $c$ or $d$ is at its high voltage level, gating circuit 54 applies a high voltage level to gating circuit 56 which, in conjunction with timing signal $cl$, triggers flip-flop A through its $Z_a$ input conductor.

The remaining portions of the signal waveforms, illustrated in Fig. 4, may be readily understood from the description set forth above. It should be noted that "or" gating circuit 54 produces a high voltage level in signal 112 when either "or" both of the input signals applied thereto are at their high voltage level. This is due to the direction of connection of diodes 67 and 68 and the fact that the potential appearing at terminal $E_2$ is of negative polarity.

From the description of operation thus far presented for the circuit of Fig. 3, it is apparent that "and" gating circuits 52 and 56 and "or" gating circuit 54 may be extended to include additional input conductors. Thus, any additional input conductors to circuit 52 would be coupled through diodes, similar to diodes 60 and 61, to common junction 62. With this done, the gating circuit would produce a pulse at the triode 80 grid of flip-flop A only when each of its input conductors had a high voltage level applied thereto.

In the same manner, any additional input conductors to "or" gating circuit 54 would be coupled to common junction 70 through diodes similar to diodes 67 and 68, and the resulting circuit would produce a high output voltage level when a corresponding voltage level appeared on any given one of its input conductors.

It should be apparent, therefore, that Boolean equations defining various combinations of logical "and" and "or" functions may be readily mechanized by the well-known "and" and "or" gating circuits, respectively. More particularly, each logical "and" function set forth in a Boolean equation by means of a · sign will be mechanized by an "and" gating circuit having a number of input terminals equal to the number of factors included by the · sign, while each logical "or" function set forth by means of a $+$ sign will be mechanized by an "or" gating circuit having a number of input terminals equal to the number of terms included by the $+$ sign. Although each $+$ or · sign may be considered to represent a separate logical function mechanizable by a separate gating circuit, it is preferable, for purposes of circuit simplicity, to mechanize consecutive like signs by a single gating circuit having one input terminal and one diode for each term or factor included by the consecutive like signs. For example, the logical "and" operations $a.b.c.d$ would be mechanized by a four-terminal "and" gating circuit, while the logical "or" operation $a+b+c$ would be mechanized by a three-terminal "or" gating circuit.

In the detailed description of Fig. 1 which follows, each of the circuits will be considered first from the standpoint of its overall function, then from the Boolean equations which define this overall function, and finally a specific mechanization of these equations. The mechanization described will be based upon the general principles of "and" and "or" circuits set forth above.

The first circuit of Fig. 1 to be illustrated and described in detail is that of quantizer 34. The function performed by quantizer 34 is that of converting the angular rotation of shaft 20 into an output signal in average form, the di-function value of which, considered over an interval of time, represents the magnitude of the angular displacement during that time interval with the sign of the di-function value representing the direction of the shaft displacement, that is, whether the displacement was in a positive or negative direction. The circuitry of quantizer 34 is set forth in detail in Fig. 5 while a so-called programming diagram is set forth in Fig. 6, the programming diagram illustrating one of the means followed in deriving the specific circuitry of Fig. 5.

The broad principles of operation of quantizer 34 will be first set forth before preceding with the description of the derivation of the specific circuitry thereof. In the first place, a principal electronic switch, such as flip-flop P, is employed whose pair of complementary output signals $p$ and $p'$ comprise the quantizer's output di-function signals. Appropriate diode gating circuitry and programming flip-flops are provided within the quantizer to normally trigger flip-flop P into changing its conduction state at the beginning of each timing interval with the result that signal $p$ normally contains a series of alternate $+1$ and $-1$ di-function values representing an average di-function value of zero.

However, this triggering circuitry is rendered inoperative to trigger flip-flop P into producing its next regularly occurring low voltage level or $-1$ value in signal $p$ upon each complete revolution of shaft 20 in its designated positive or counterclockwise direction. Also, the triggering circuit is rendered inoperative to trigger flip-flop P into producing its next regularly occurring high voltage level or $+1$ value in signal $p$ upon each complete revolution of shaft 20 in its negative or clockwise direction. This results in the production of two consecutive high voltage levels or $+1$ values for each revolution of shaft 20 in the positive direction and in two consecutive low voltage levels or −1 values for each revolution of shaft 20 in the negative direction.

In order to provide the necessary triggering sequences for flip-flop P, two programming or memory electronic switches, such as flip-flops I and J, are utilized, flip-flop I producing two complementary output signals $i$ and $i'$ and flip-flop J producing two complementary output signals $j$ and $j'$.

Programming flip-flops I and J are required since a relatively large number of contact sequences is possible between segment 24 and brushes A, B and C upon various magnitudes of positive and negative angular displacements of shaft 20. For example, segment 24 may sequentially make the following brush contacts; B to A to B, B to A to C, B to C to B, B to C to A, etc. In quantizer 34, the brush contact sequence B to A to C is defined as one complete revolution of shaft 20 in the positive direction while the contact sequence B to C to A is defined as one complete revolution of shaft 20 in the negative direction.

As will be apparent, a wide variety of partial sequences may occur before a complete positive or negative sequence as above defined is concluded. Flip-flops I and J serve as memory devices in that the different contact sequences produce different triggering sequences thereof such that their conduction states, at any given instant, indicate the particular contact sequence just completed. Thus, their conduction states produced by the above defined positive and negative shaft rotations are utilized to provide appropriate triggering for flip-flop P so that signal $p$ will have the above stated characteristics.

The programming diagram of Fig. 6 serves to indicate in a schematic manner, the particular triggerings of flip-flops P, I and J upon all possible sequences of contact between segment 24 and brushes A, B and C. As will be apparent, although all of such possible contact sequences must be considered, the particular triggerings of flip-flops P, I and J produced by any given sequence was arbitrarily chosen as the first step in the design process.

A Programming Table I is herewith included below to be considered concurrently with Fig. 6, Table I additionally serving later as a basis for writing the Boolean equations defining the gating circuitry found in Fig. 5.

Similarly, the potential at brushes A, B and C when the brushes are not contacting segment 24 should be equal to the low voltage level appearing on terminal $E_3$ in Fig. 3, so that signals $a$, $b$ and $c$ will be incapable of opening any gating circuits when the brush is not in contact with segment 24. This result may be readily accomplished by connecting terminal $E_3$ to brushes A, B and C through suitable resistors.

The Idle program, as defined and illustrated in the left-hand block as viewed from Fig. 6, exists whenever segment 24, after having contacted brush B, presently lies between brushes A and C. During this program, flip-flop P is to be alternately triggered so that $p$ equals $+1$ and $-1$ during successive timing intervals while flip-flops I and J are triggered to produce a steady $i=-1$ and $j=-1$. This program is likewise indicated on line 1 of Table I.

From the Idle program position, segment 24 may travel and contact either brush A or brush C. If brush A is contacted, the Alpha ($\alpha$) program, as indicated in the upper block, as viewed from Fig. 6, is to be generated or set into the flip-flops at the beginning of the next timing interval. Program Alpha, as will be noted, contains both $p=\pm 1$ and $p=-1$ denoting that flip-flop P is alternately triggered as it was during the Idle program while flip-flop J is triggered, as indicated in column 9, line 2 of Table I, to produce $j=+1$, flip-flop I remaining unchanged to produce $i=-1$.

After contacting brush A, segment 24 may contact either brush B again or may contact brush C. If brush B is contacted, then program Idle must be again generated as indicated on line 3, by triggering flip-flop J, at the beginning of the time interval following this new contact with brush B, to produce $j=-1$.

If, during the Alpha program, segment 24 contacts brush C, then, by definition, one complete revolution of shaft 20 has been made in the positive direction, and to indicate this revolution, as has been stated, flip-flop P is to produce $p=+1$ for two consecutive timing intervals. This is accomplished by generating a Gamma ($\gamma$) program, as indicated in the right hand block as viewed from Fig. 6, the Gamma program being a transitory one lasting for only one timing interval. This Gamma program is, at the end of this one interval, automatically

*Programming Table I*

| Line | Brush | | | Contents | | | To Generate | | | Output | | Corresponds in programming diagram to— |
|---|---|---|---|---|---|---|---|---|---|---|---|---|
| | $a$ | $b$ | $c$ | $p$ | $i$ | $j$ | $p$ | $i$ | $j$ | $+1$ | $-1$ | |
| 1 | | {1, 0} | | +1 or −1 | −1 | −1 | | | | | | Idle (I) |
| 2 | 1 | | | +1 or −1 | −1 | −1 | | | +1 | | | I→α |
| 3 | | 1 | | +1 or −1 | −1 | +1 | | | −1 | | | α→I |
| 4 | | | 1 | +1 | −1 | +1 | | | | | | Hold α |
| 5 | | | 1 | −1 | −1 | +1 | | +1 | | | | α→γ |
| 6 | | | | +1 | +1 | +1 | +1 | | −1 | 1 | | Hold $p$ |
| 7 | | | | +1 | +1 | −1 | | | | | | γ→β |
| 8 | | 1 | | +1 | +1 | −1 | | −1 | | | | to I |
| 9 | | 1 | | +1 or −1 | −1 | −1 | | −1 | | | | β→I |
| 10 | | | 1 | +1 or −1 | −1 | −1 | | | +1 | | | I→β |
| 11 | 1 | | | −1 | +1 | −1 | | | | | | Hold β |
| 12 | 1 | | | +1 | +1 | −1 | | | +1 | | | β→γ |
| 13 | | | | −1 | +1 | +1 | −1 | −1 | | | 1 | Hold $p'$ |
| 14 | | | | −1 | +1 | +1 | | | | | | γ→α |
| 15 | | 1 | | −1 | −1 | +1 | | −1 | | | | to I |
| 16 | | | | +1 or −1 | −1 | −1 | | | | | | Idle |
| Col | 1 | 2 | 3 | 4 | 5 | 6 | 7 | 8 | 9 | 10 | 11 | |

In Table I, columns 1, 2 and 3 are devoted to the signals $a$, $b$ and $c$ appearing on brushes A, B, and C, respectively, owing to possible contacts made between them and segment 24. Upon such a contact, the potential of potential source 27 is applied to the brush contacted with the brush's corresponding signal having a di-function value of $+1$. As will be apparent, the potential of battery 27 should equal the high voltage level appearing on terminal $E_4$ in Figure 3 so that it will be capable of opening any gating circuits to which it may be applied.

programmed by the timing signal into a stable Beta ($\beta$) program as indicated by the lower block in Fig. 6.

This transition from the Alpha program to the Beta program through the intermediate Gamma program is begun only during the timing interval that segment 24 contacts brush C while signal $p=-1$. This is possible since, by previous definition, the timing signal frequency must be so related to the maximum shaft rotational speed as to produce two timing intervals during any single contact between commutator segment 24 and any given one of the brushes. Thus, brush C, if contacted during the Alpha program, will be contacted during two consecutive timing intervals and signal $p$ will accordingly have the values of either $-1$ and $+1$ or $+1$ and $-1$ during these two intervals.

If this contact should be made when $p=+1$, then the hold Alpha program as indicated on line 4 of Table I must be observed with no additional triggering done. Then, during the next following timing interval when $p=-1$, signal $c$ still being equal to 1, program Gamma is generated from program Alpha by triggering flip-flop I into producing $i=+1$.

During the next or "hold $p$" timing interval, as indicated on line 6, $p$ will again be $+1$ as will $j$ and $i$ since $i$ was set equal to $+1$ at the beginning thereof. Now, at the beginning of the next timing interval, program Gamma is to be automatically generated into program Beta with flip-flop P producing an extra $p=+1$ to indicate thereby, one complete positive shaft revolution. Thus, on line 6, column 7, flip-flop P is to continue producing $p=+1$ during this next timing interval while $j=-1$ is to be generated as indicated in column 9. With this accomplished, program Beta initially begins with $p=+1$, $i=+1$ and $j=-1$.

Once program Beta has been generated, signal $p$ will again vary between $+1$ and $-1$ during consecutive timing intervals while signals $i$ and $j$ will remain equal to $+1$ and $-1$, respectively, as indicated in the left hand hand portion of the Beta program block. If now, segment 24 should contact brush B, the Idle program will again be generated during the timing interval of this contact that $p=+1$ by triggering flip-flop I to produce $i=-1$ as indicated on line 8 of Table I.

If segment 24 should contact brush C during the Idle program, as indicated on line 10, the Beta program will be generated at the beginning of the next timing interval by triggering flip-flop I to produce $i=1$. If shaft 20 continues to move in this negative direction of rotation until segment 24 contacts brush A then, by definition, shaft 20 has made one complete revolution in the negative direction and the transitory Gamma program is generated from the Beta program.

During the first instant of contact between segment 24 and brush A, signal $p$ may be equal to $-1$ or $+1$. If $p$ is equal to $-1$, line 11 of Table I is observed and none of the flip-flops are triggered thus "holding" the Beta program for that interval. During the next timing interval, as indicated on line 12, $p=+1$ and to generate the Gamma program, flip-flop J must be triggered to produce $j=+1$. With this accomplished, as indicated on line 13, $p=-1$, and $i$ and $j$ both equal to $+1$.

The Alpha program is then automatically generated at the begining of the next timing interval from the transitory Gamma program such that flip-flop P produces an extra $p=-1$ to indicate one complete revolution of shaft 20 in a negative direction. Also, flip-flop I must be triggered to produce $i=-1$, these triggerings of flip-flop P and I being indicated in columns 7 and 8, respectively, of line 13. The Alpha program, as indicated on line 14, is thus generated at the beginning of the next timing interval. With no further rotation of shaft 20, program Alpha is maintained with signal $p$ once again varying between $+1$ and $-1$ during successive timing intervals and with signals $i$ and $j$ being equal to $-1$ and $+1$, respectively.

As is apparent, if commutator segment 24 should have first contacted brush A in the example just given during a timing interval when $p=+1$, the "hold" Beta program indicated on line 11 would be unnecessary and the Beta to Gamma program indicated on line 12 would have been immediately generated during the next timing interval.

If segment 24 contacts brush B after contacting brush C, the Idle program, as again illustrated on line 16, will be generated during the timing interval of the contact when $p=-1$, as indicated on line 15.

The Boolean equations defining the series of programs found in Table I may be readily written and from them a circuit mechanization obtained capable of electronically producing each program upon completion of its corresponding brush contact sequence. For example, in writing the Boolean equations representing the circuitry to be connected to the $S_i$ input conductor of flip-flop I, it is apparent by inspection of the "to generate" column 8 of Table I triggering signals are to be applied to this conductor only during those timing intervals found on lines 5 and 10 where the $+1$ symbols appear. The $+1$ symbol, as will be remembered, appears whenever flip-flop I is to be triggered at the beginning of the next following timing interval to produce $i=+1$ at that time.

Thus, for line 5 of Table I, it is seen that flip-flop I is to be triggered to produce $i=+1$ whenever signals $p$, $i$ and $j$ are simultaneously equal to $-1$, $-1$ and $+1$, respectively, with brush C being contacted by segment 24 so that $c=1$. This signifies electronically that an "and" gating circuit should be employed capable of producing a triggering signal at the $S_i$ conductor upon each occurrence of this particular combination of $p$, $i$, $j$ and $c$ signals. However, the $p$ and $i$ signals cannot be used directly as gating signals since they are at their $-1$ or low voltage level and hence, incapable of opening an "and" gating circuit of the type illustrated in Fig. 4. Therefore, the complementary signals $p'$ and $i'$ must be used since they will be at their high voltage level or $+1$ value whenever signals $p$ and $i$ are equal to $-1$.

Accordingly, bearing in mind the timing signal $cl$, the Boolean expression for line 5 will be:

$$S_i = c \cdot p' \cdot i' \cdot j \cdot cl \qquad \text{(Eq. 3)}$$

Another equation must be written for line 10 where $i$ is also equal to $+1$. In this case, since $p$ equals both $+1$ and $-1$, an expression must be written for both of these values. Here also, it must be remembered that the complementary signal of any signal equal to $-1$ must be employed in order to provide proper operation of the "and" gating circuit. The expression when $p=+1$ will be:

$$S_i = c \cdot p \cdot i' \cdot j' \cdot cl \qquad \text{(Eq. 4)}$$

and the expression when $p=-1$ will be:

$$S_i = c \cdot p' \cdot i' \cdot j' \cdot cl \qquad \text{(Eq. 5)}$$

A final Boolean equation must be written to contain each of the above Equations 3, 4 and 5. This is done by logically adding the equations, the significance of the logical addition being that a triggering signal is to be applied to the $S_i$ input conductor each instance any given one of Equations 3 through 5 is electrically satisfied by the signals represented by its terms. Thus, the combined equation becomes:

$$S_i = c \cdot p' \cdot i' \cdot j \cdot cl + c \cdot p \cdot i' \cdot j' \cdot cl + c \cdot p' \cdot i' \cdot j' \cdot cl \qquad \text{(Eq. 6)}$$

Equation 6 may be readily mechanized by employing the principles outlined in connection with Fig. 2. However such a mechanization will not result in the simplest circuit embodiment, that is, one having the fewest possible number of gating circuits and yet still be capable of producing the desired result. However, by employing various so called logical or Boolean tautologies, Equation 6 may be simplified to a minimum number of terms which, in turn, when mechanized, yield the simplest circuit embodiment. This reduction results in:

$$S_i = (j' + p') \cdot c \cdot i' \cdot cl \qquad \text{(Eq. 7)}$$

As will be understood by those skilled in the art, each equation derived in the process of simplifying Equation 6, or for that matter, each and every equation which may be written from Equation 6, whether expanded or reduced, represents a circuit embodiment capable of performing the electrical results desired for the circuit mechanization of Equation 7. Obviously, the scope of this invention is intended to include the mechanization of all such possible equations although only one such circuit is illustrated. The same holds true for each of the remaining Boolean equations to be later derived in connection with this and other components of the present invention.

In the manner set forth above for writing Equations 3 through 6 from Table I, the equation for the signal to be applied to $Z_i$ input conductor of flip-flop I may be written as:

$$Z_i = b \cdot p \cdot i \cdot j' \cdot cl + p' \cdot i \cdot j' \cdot cl \cdot b + p \cdot i \cdot j' \cdot cl \quad \text{(Eq. 8)}$$

Equation 8 may be simplified to:

$$Z_i = (b \cdot j' + p' \cdot j) \cdot i \cdot cl \quad \text{(Eq. 9)}$$

In the same manner the equation for $S_j$ may be written from Table I as:

$$S_j = a \cdot p \cdot i' \cdot j' + a \cdot p' \cdot i' \cdot j' + a \cdot p \cdot i \cdot j \quad \text{(Eq. 10)}$$

Equation 10 may be simplified to:

$$S_j = (i' + p) \cdot a \cdot j' \cdot cl \quad \text{(Eq. 11)}$$

Also, the equation for $Z_j$ may be written from Table I and simplified to:

$$Z_j = (b \cdot i' + p \cdot i) \cdot j \cdot cl \quad \text{(Eq. 12)}$$

The equations for $S_p$ and $Z_p$ may be derived in several ways including the way set forth above for the $S_i$, $Z_i$, etc. equations. However, the most readily understandable technique is to bear in mind that flip-flop P is to be alternately triggered by signals applied to its $S_p$ and $Z_p$ input conductors except when the conditions appearing on lines 6 and 13 of Table I are present, that is, when both $i$ and $j$ are equal to $+1$. This, in turn, leads by inspection to the equations:

$$S_p = p' \cdot (i' + j') \cdot cl \quad \text{(Eq. 13)}$$

$$Z_p = p \cdot (i' + j') \cdot cl \quad \text{(Eq. 14)}$$

In equation 13, for example, if $i$ and $j$ are both equal to $+1$, then their corresponding complementary signals $i'$ and $j'$ are both equal to $-1$, and the "or" gating circuit, representing the portion of the equation $(i'+j')$ will produce a low output voltage level which will be incapable of opening the "and" gating circuit connected to the $S_p$ input conductor. Since the same is also true for Equation 14, it is seen that Equations 13 and 14 satisfy the specified triggering requirements for flip-flop P.

Referring now again to Fig. 5, there is illustrated quantizer 34 embodying the electrical mechanization of Boolean Equations 7, 9, 11, 12, 13 and 14. The mechanization of each equation is performed in the manner set forth previously in the example of Figures 2 and 3, and no repetition of the steps followed is deemed necessary. In order to render the circuit diagram more readily understandable, the A, B and C brushes, the $p$, $p'$, $i$, $i'$, $j$ and $j'$ signal output conductors, and the output conductor of source 42 are each connected to a corresponding vertical bus, as viewed from Fig. 5, each bus being designated in accordance with the signal applied thereto. The input terminals of each gating circuit are, in turn, connected to the appropriate vertical buses as defined in its corresponding Boolean equation.

It will be noted that a common term $(i'+j')$ appears in Equations 13 and 14, defining $S_p$ and $Z_p$, respectively. In mechanizing these equations, only one "or" gating circuit, namely, gating circuit 100 of Fig. 5, is employed, its two input terminals being connected to the $i'$ and $j'$ buses, respectively. Its output terminal is connected to two "and" gating circuits 102 and 104 which form the remaining portions of Equations 13 and 14, respectively.

It is, therefore, seen that Equation 13, which includes one + sign and two . signs is mechanized by means of one "and" gating circuit and one "or" gating circuit. More particularly, the + sign is mechanized by means of two-terminal "or" gating circuit 100 receiving signals $i'$ and $j'$, and the two . signs are mechanized by a single three-terminal "and" gating circuit, namely circuit 102, receiving signals $p'$, $cl$ and the output signal of circuit 100. Similarly, Equation 14, which also contains one + sign and two . signs, is mechanized by "or" gating circuit 100 and three-terminal "and" gating circuit 104 which differs from circuit 102 only in the receipt of signal $p$ rather than $p'$.

Equation 7 contains one + sign and three . signs and is mechanized in Fig. 5 by means of one two-terminal "or" circuit and one four-terminal "and" circuit, respectively. Equation 9, on the other hand, contains a single + sign defining an "or" operation on complex "and" terms $(b \cdot j')$ and $(p' \cdot j)$, and two additional . signs. The two complex "and" terms of the "or" operation are mechanized by two-terminal "and" gating circuits, the "or" operation by one two-terminal "or" gating circuit, and the remaining two . signs by a three-terminal "and" gating circuit.

Equation 11 includes a + sign and three . signs which are mechanized in Fig. 5 by a two-terminal "or" gating circuit and a four-terminal "and" gating circuit, respectively. Equation 12, on the other hand, is similar to Equation 9 and has the same gating circuit arrangement except for the interchange of signals $i$ and $j$.

At this point it is helpful to trace through one of the sequences shown in Table I and Fig. 6 in order to establish the operability of the mechanization of Fig. 5. Assume first that the quantizer of Fig. 5 is in its idle condition, that is with signals $i$ and $j$ equal to $-1$, and that segment 24 lies between brushes A and B. Under these conditions, the output signal from "or" gating circuit 100 will be high $(i'=j'=+1)$ and the state of flip-flop P will be changed every timing interval by means of "and" circuits 102 and 104. On the other hand, since brushes C and A are at their relatively low level potentials the $S_i$ and $S_j$ "and" gating circuits cannot be opened and signals $i$ and $j$ will remain at $-1$, as shown in line 1 of the table.

If brush A is now contacted by segment 24, as shown in line 2 of Table I, then all of the conditions for the $S_j$ "and" gating circuit are satisfied, and flip-flop J is triggered to set signal $j$ to $+1$ and thereby initiate the α program shown in Fig. 6 and line 2 of the table. Since signal $i$ still remains at $-1$, the output of "or" gating circuit 100 will remain high and flip-flop P will still be changed every timing interval.

During the passage of segment 24 in the counter-clockwise or + direction from brush A to brush C, signal $i$ remains $-1$ and, therefore, signal $p$ alternates in level each timing interval. At the same time, since signal $b$ also remains $-1$, Equation 12 for $Z_j$ cannot be satisfied and signal $j$ remains at $+1$. Therefore, the α program is maintained until segment 24 contacts brush C.

When segment 24 contacts brush C, signal $p$ may be either $+1$ or $-1$ as indicated in lines 4 and 5 of Table I. If signal $p$ is $+1$, then the output of the "or" gating circuit in the $S_i$ input of Fig. 5 remains low (since $p'=j=-1$) and signal $i$ remains at $-1$. At the same time signal $j$ remains $+1$ and the α program is held as indicated in line 4 of the table. On the other hand, when signal $p$ is $-1$, the output of the "or" gating circuit becomes high and signal $i$ becomes $+1$. Since signal $j$ remains $+1$, the α program is transformed to the γ program, as shown in Fig. 6 and line 5 of the table.

At this point signal $i$ and $j$ are both $+1$. Similarly, signal $p$ is $+1$ since it was just changed from $-1$ at the same time that signal $i$ was changed. Under these conditions, the output signal from "or" gating circuit 100 will be at its low level $(i'=j'=-1)$, and no signal will be applied to flip-flop P. Accordingly, signal $p$ will remain $+1$ for a second consecutive timing interval, as indicated by line 6 of Table I. At the same time, since signals $p$ and $i$ are both $+1$, the output of one of the two-terminal "and" gating circuits of the mechanization of Equation 12 will be +1 and, since signal $j$ is also +1, the next $cl$ will open the three-terminal "and" gating circuit and change signal $j$ to −1. Accordingly, the $\gamma$ program is changed to the $\beta$ program, as shown in Fig. 6 and line 7 of the table.

Although quantizer 34 has been illustrated and described as receiving its input signals from three brushes being contacted sequentially by a rotating commutator segment, it will be apparent to those skilled in the art that other means exist for converting angular movement into input signals appropriate for this quantizer. Thus, for example, three magnetic transducers with appropriate amplifying circuits may be subsituted for the brushes illustrated, with segment 24 being replaced by a small permanent magnet or other appropriate magnetic means. Likewise, optical means employing three photocells may be utilized, as could cam followers actuated by raised portions on the periphery of the rotating disc. These and other forms could be employed without affecting the actual operation of the quantizer circuit nor departing from the scope and spirit of the present invention.

Although only one commutator segment and insulated insert have been illustrated, it is apparent that a plurality of equally spaced commutator segments and inserts could be employed, the length of the insulated insert lying between any two of such segments being greater than the maximum spacing between brushes A and C. This latter requirement is necessary so that the same contact sequence, as set forth above, will be followed in the actual operation of the device.

It will also be apparent to those skilled in the art, that quantizer 34 may be used to convert longitudinal as well as angular movement into a di-function signal which represents the direction and magnitude of the movement. In such an embodiment, the three brushes would lie in alignment with the movement of a longitudinally movable member, the movable member having alternate commutator segments and insulated portions positioned along the alignment of, and contacting the brushes.

As will be apparent to those skilled in the art, other quantizers, similar to quantizer 34 may be designed without departing from the spirit and the scope of this invention by arbitrarily designing the programs thereof to correspond to other sets of brush contact sequences.

As will be apparent from the logic of quantizer 34, the only requirement for successful operation thereof is that each brush-commutator segment contact be maintained for at least two timing intervals. If this condition is fulfilled, then the appropriate flip-flops are triggered and will not again be triggered until another brush is contacted. Hence, once a satisfactory contact is made, the given brush may bounce into and out of contact with the disc, or may engage and disengage the commutator segment without causing spurious operation of the quantizer.

Figure 7B:
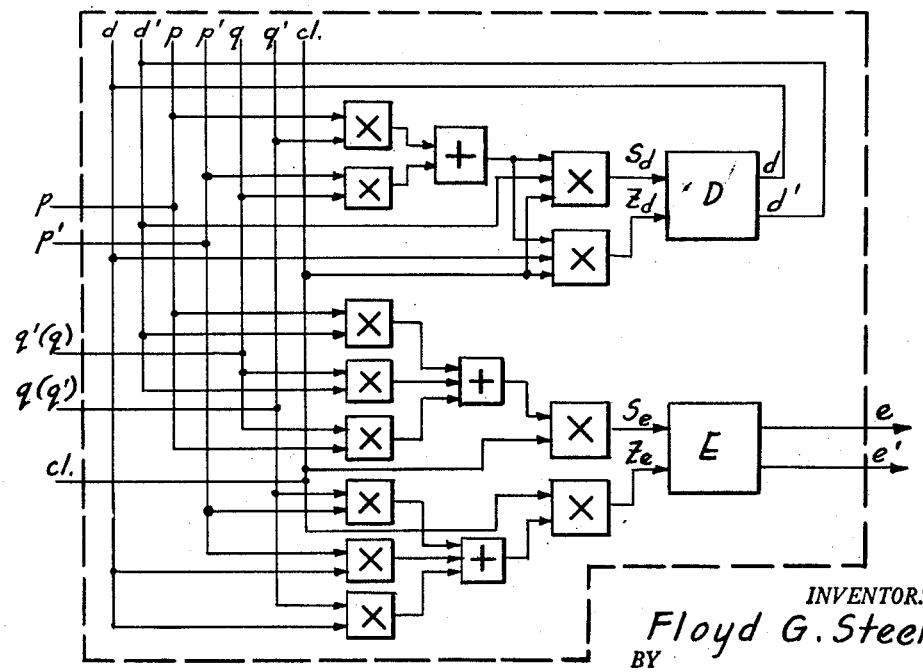

Referring now to Figures 7a and 7b, there is illustrated in detailed form a pair of di-function half-adders or averagers according to the present invention. As was stated in connection with Fig. 1, a di-function subtraction between signals $p$ and $q$ was required and, to accomplish this, a reversal of the input connections of the $q$ and $q'$ signal conductors of quantizer 42 must be made. However, for the purpose of explaining di-function half addition, it will be assumed that the $q$ and $q'$ signals, as indicated within the brackets of Figures 7a and 7b are applied to the adder so as to be added thereby to signals $p$ and $p'$.

As was stated previously, the average value of a signal in di-function form, for a given number of timing intervals, is defined as a ratio between the number of timing intervals the signal is at its high voltage level or +1 value minus the number of timing intervals it is at its low voltage level or −1 value divided by the total number of the given time intervals. Since the average of any di-function signal considered over any interval of time can never be greater than +1 or less than −1 under the above definition, it is obviously impossible, using the same timing scale, to add two di-function signals together and produce a third di-function signal whose average value is equal to the actual sum of the average values of the two added signals.

However, the two di-function signals may be added, as is done by adder 45, so as to obtain one-half their sum, the addition performing an inherent scaling down of their actual sum by a factor of one-half. This scaling down thus makes it possible to represent the sum of the instantaneous di-function values of +1 and +1 as an instantaneous value of +1, and the sum of −1 and −1 as −1. However, since no instantaneous di-function value of zero exists, it is apparent that a difficulty arises when the addition of two instantaneous di-function values which differ, that is, the sum of the values +1 and −1 or −1 and +1 is required. This difficulty is overcome by the adder of the present invention in producing a +1 value, for example, during the first timing interval that the signals to be added differ and then producing a −1 value during the next timing interval that the signals differ. In this way, the average output di-function signal value, when considered over any two consecutive timing intervals that the input di-function signals differ, is always equal to zero, the desired value.

The circuitry of Figures 7a and 7b are mechanizations of a group of Boolean equations, which equations are derived from a programming table as set forth below in Table II.

*Programming Table II*

| Line | Program | | | Case 1 | Case 2 | To Generate—Case 1 | | | | To Generate—Case 2 | | | |
|---|---|---|---|---|---|---|---|---|---|---|---|---|---|
| | $p$ | $q$ | $d$ | $e$ | $e$ | $S_e$ | $Z_e$ | $S_d$ | $Z_d$ | $S_e$ | $Z_e$ | $S_d$ | $Z_d$ |
| 1 | −1 | −1 | −1 | −1 | −1 | | 1 | | | | 1 | | |
| 2 | −1 | −1 | +1 | −1 | −1 | | 1 | | | | 1 | | |
| 3 | −1 | +1 | −1 | −1 | +1 | | 1 | 1 | | 1 | | 1 | |
| 4 | −1 | +1 | +1 | +1 | −1 | 1 | | | 1 | | 1 | | 1 |
| 5 | +1 | −1 | −1 | −1 | +1 | | 1 | 1 | | 1 | | 1 | |
| 6 | +1 | −1 | +1 | +1 | −1 | 1 | | | 1 | | 1 | | 1 |
| 7 | +1 | +1 | −1 | +1 | +1 | 1 | | | | 1 | | | |
| 8 | +1 | +1 | +1 | +1 | +1 | 1 | | | | 1 | | | |
| Col | 1 | 2 | 3 | 4 | 5 | 6 | 7 | 8 | 9 | 10 | 11 | 12 | 13 |

As will be observed from Fig. 7a, half-adder 45 contains a programming or memory electronic switch, such as flip-flop D, and an adder electronic switch, such as flip-flop E, the half-adder output signals $e$ and $e'$ being the output signals produced by flip-flop E. Flip-flop D produces output signals $d$ and $d'$, the conduction state of flip-flop D serving, in a sense, as a memory for providing proper triggering sequence for flip-flop E during the timing intervals that the instantaneous di-function values of input signals $p$ and $q$ differ. This memory is primarily necessary since $p$ and $q$ may differ in value during a given time interval and then not differ again until several timing intervals later. Thus, in order that an average value of zero be generated for these two spaced timing intervals, it is necessary to remember between them the instantaneous value of output signal $e$ during the first timing interval, so that flip-flop E may be triggered to produce the other instantanous value of signal $e$ during the second interval.

In Table II, all possible combinations of values of signals $p$, $q$ and $d$ are set forth in columns 1, 2 and 3, respectively, on lines 1 through 8. For example, on lines 1 and 2, where $p$ and $q$ are both equal to $-1$, $d$ may be equal to either $-1$, as on line 1, or $+1$ as on line 2. The values of $e$ in Case 1 as presented in column 4, or Case 2 as presented in column 5, is equal to $-1$, on lines 1 and 2 or one-half of the sum of $p=-1$ and $q=-1$. Also, on lines 7 and 8, $e$ is equal to $+1$, in both cases, corresponding to one-half the sum of $p=+1$ and $q=+1$. The value of $d$ is immaterial for these sets of values of $p$ and $q$ since $e$ is always equal to one-half their sum.

However, the value of $d$ becomes important as a memory signal on each of lines 3 through 6 where the values of $p$ and $q$ differ. In Case 1, $e$ is arbitrarily set equal to $-1$ on line 3 whenever signals $p$, $q$ and $d$ are equal to $-1$, $+1$ and $-1$, respectively, and is set equal to $+1$, $-1$, and $+1$ on lines 4, 5 and 6, respectively, in accordance with the values of signals $p$, $q$ and $d$ contained thereon.

In Case 2, $e$ is arbitrarily set equal to $+1$ for the values of $p$, $q$ and $d$ defined on line 3 and is set equal to $+1$, $-1$ and $+1$ on lines 4, 5 and 6, respectively. As is apparent, Cases 1 and 2 define the only two possible arbitrary sets of values that $e$ may take when the values of $p$ and $q$ differ.

There is found in columns 6, 7, 8 and 9 of Table II, the triggering signals to be applied to $S_e$, $Z_e$, $S_d$ and $Z_d$ input conductors, respectively, of flip-flops E and D for Case 1. For each of the $S_e$ and $Z_e$ conductors, a signal is always applied thereto in order to produce the value of $e$ indicated in column 4. Thus, on the simultaneous appearance of the values of $p$, $q$ and $d$ as found on lines 1 through 3 and 5 where $e$ is equal to $-1$, a signal is to be applied to the $Z_e$ conductor in order to make $e=-1$. In the same manner, a signal is to be applied to the $S_e$ input conductor in order to make $e=+1$ each instance, as indicated on lines 4 and 6 through 8, the value of $e$ is equal to $+1$.

In considering the signals to be applied to the $S_d$ and $Z_d$ conductors, as has been stated, the value of $d$ is immaterial when both of signals $p$ and $q$ are either $+1$ or $-1$ as indicated on lines 1, 2, 7 and 8 since the value of $e$ produced during such instances will always be one-half of the sum thereof. Thus, consideration must be given to the triggering of flip-flop D only during the timing intervals, as set forth on lines 3 through 6, that the values of $p$ and $q$ differ.

Stated briefly, at the appearance of any of the combinations of values of signals $p$, $q$ and $d$ set forth on lines 3 through 6, flip-flop D is to be triggered at the beginning of the next timing interval into its other conduction state. If this is done, then the next value of $e$ produced during the next timing interval that $p$ and $q$ differ will be of opposite value than was its value during the first mentioned timing interval. This is true since, as has been stated, the value of $d$ is not changed during the programs set forth on lines 1, 2, 7 and 8 when the values of $p$ and $q$ are identical. Thus, each change of $d$ will remain until the next occurrence of a difference in the $p$ and $q$ signal values.

From the Case 1 programs found in columns 7 through 9 of Table II, and including timing signal $cl$ from source 44, the Boolean equations defining the desired programming of flip-flops D and E may be written and reduced to:

$$S_d = d' \cdot (p' \cdot q + p \cdot q') \cdot cl \qquad \text{(Eq. 15)}$$
$$Z_d = d \cdot (p' \cdot q + p \cdot q') \cdot cl \qquad \text{(Eq. 16)}$$
$$S_e = (p \cdot q + p \cdot d + q \cdot d) \cdot cl \qquad \text{(Eq. 17)}$$
$$Z_e = (p' \cdot q' + p' \cdot d' + q' \cdot d') \cdot cl \qquad \text{(Eq. 18)}$$

In setting forth the Boolean equations defining the programming indicated in columns 10 through 13 for the Case 2 example, it will be observed that the triggering signals applied to the $S_d$ and $Z_d$ conductors of flip-flop D are identical to the Case 1 example given above. This is due to the fact that the values signal $d$ takes, as set forth, in the third column upon the various possible combinations of signals $p$ and $q$, are equally applicable to both cases since the cases differ only in the values assigned to signal $e$. Accordingly, Equations 15 and 16 apply also to the Case 2 example, and the only new equations that need be written for this case are the ones for $S_e$ and $Z_e$. These from columns 10 and 11 may be reduced to:

$$S_e = (p \cdot d' + q \cdot d' + p \cdot q) \cdot cl \qquad \text{(Eq. 19)}$$
$$Z_e = (p' \cdot q' + p' \cdot d + q' \cdot d) \cdot cl \qquad \text{(Eq. 20)}$$

The half-adder circuit of Fig. 7a is a mechanization of Equations 15, 16, 17 and 18, the mechanization being effected in the manner set forth previously in connection with Figures 2 and 3. However, as has been stated, it is desired to utilize adder 45 in the device of Fig. 1, to produce an output signal whose di-function value is a difference between the di-function values of signals $p$ and $q$. Thus, the operation of di-function subtraction is necessary and is performed by circuit 45 by interchanging the $q$ and $q'$ input signals such that the signal $p$ is added to signal $q'$, the complement of signal $q$.

Consider now the mechanization of Equations 15 through 18 shown in Fig. 7a. More particularly, consider first Equations 15 and 16 which define the $S_d$ and $Z_d$ signals, respectively, for flip-flop D. It will be noted that Equation 15 includes one "and" operation including three factors, namely, $d'$, $cl$, and the output of an "or" function. The "or" function includes two terms both of which are outputs of "and" functions. Accordingly, Equation 15 is mechanized in Fig. 7a by one three-terminal "and" gating circuit receiving signals $d'$, $cl$ and the output of a two-terminal "or" gating circuit which, in turn, receives the output signals of two two-terminal "and" gating circuits. One of the two-terminal "and" gating circuits receives signals $p$ and $q'$, while the other two-terminal "and" gating circuit receives signals $p'$ and $q$.

In connection with the mechanization of Equation 16, it should be noted that this equation differs from Equation 15 only in the use of signal $d$ rather than signal $d'$. For simplicity of circuitry, therefore, the mechanization of Equation 16 in Fig. 7a utilizes the same "or" gating circuit and two-terminal "and" gating circuits as those utilized for Equation 15. In addition the mechanization of Equation 16 includes a three-terminal "and" gating circuit receiving signals $d$, $cl$ and the output of the "or" gating circuit.

Equation 17, which defines the $S_e$ signal for flip-flop E includes a two-terminal "and" gating circuit receiving signal $cl$ and the output of a three-terminal "or" gating circuit which, in turn, receives the outputs of three two-terminal "and" gating circuits. The inputs to the three "and" gating circuits are, reading from top to bottom in Fig. 7a: signals $d$ and $q$; signals $p$ and $q$; and signals $d$ and $p$. The mechanization of Equation 18 includes exactly the same number and type of gating circuits as that of Equation 17, except that the input signals to the two-terminal "and" gating circuits are different. More particularly, the inputs to the three circuits in the mechanization of Equation 18 are, reading from top to bottom: signals $p'$ and $q'$; $p'$ and $d'$; and $q'$ and $d'$.

Consider now the operation of the adder of Fig. 7a in response to input difunction signal trains $p$ and $q$ having values of $+¾$ and $+¼$, respectively. As noted above, adder 45 operates to subtract signal train $q$ from signal train $p$ by adding complementary signal train $q'$ to signal train $p$, signal train $q'$ having a value of $-¼$. Accordingly, assuming that signal $d$ is initially $-1$, adder 45 operates as follows in response to consecutive signals of trains $p$ and $q'$:

|   | 1 | 2 | 3 | 4 | 5 | 6 | 7 | 8 | 9 |   |
|---|---|---|---|---|---|---|---|---|---|---|
| $p$ | + | + | + | + | + | + | + | − |   | =+¾ |
| $q'$ | − | + | + | − | + | + | − | + |   | =−¼ |
| $d$ | − | − | + | − | − | + | + | − |   |   |
| $d'$ | + | − | + | + | − | + | + | − | + |   |
| $S_d$ | 1 | 0 | 0 | 1 | 0 | 0 | 1 | 0 |   |   |
| $Z_d$ | 0 | 1 | 0 | 0 | 1 | 0 | 0 | 1 |   |   |
| $S_e$ | 0 | 1 | 1 | 0 | 1 | 1 | 0 | 1 |   |   |
| $Z_e$ | 1 | 0 | 0 | 1 | 0 | 0 | 1 | 0 |   |   |
| $e$ |   | − | + | + | − | + | + | − | + | =+¼=½(½) |

As shown in the table, during the first time interval signals $p$ and $q'$ are different and the output of the "or" gating circuit for $S_d$ and $Z_d$ is high. Since $d$ is assumed to be −1 (and $d'=+1$) for this interval, the final "and" gating circuit for $S_d$ is opened and flip-flop D triggered to set $d$ to +1 in the second time interval. On the other hand, since signals $q'$ and $d$ are both −1 during the first time interval, the top two-terminal "and" gating circuit for $Z_e$ is opened and signal $e$ becomes −1 in the second time interval.

Consider now the values of $S_d$ and $Z_d$ during the remaining time intervals of the table. During the second, fourth, fifth, seventh and eighth time intervals, signals $p$ and $q'$ are different. Accordingly, the output of the "or" gating circuit of $S_d$ and $Z_d$ is high during these intervals, and the state of flip-flop D is reversed. In other words, signal $d$ during the third, fifth, sixth, eighth and ninth intervals is the complement of signal $d$ during the second, fourth, fifth, seventh and eighth intervals. On the other hand, during the third and sixth intervals, signals $p$ and $q'$ are both +1. Accordingly, the "or" gating circuit remains closed during these intervals and signal $d$ is unchanged.

Consider now the values of $S_e$ and $Z_e$ during the remaining intervals of the table. Signals $q'$ and $d$ during the fourth and seventh intervals are identical to $q'$ and $d$ during the first interval. Accordingly $Z_e$ is opened during the fourth and seventh intervals, and signal $e$ becomes −1 in the fifth and eighth intervals. During the third and sixth intervals, signals $p$ and $q'$ are both +1. Under these conditions, the middle two-terminal "and" gating circuit for $S_e$ is opened and signal $e$ becomes +1 in the fourth and seventh intervals. During the second and fifth intervals, signals $p$ and $d$ are both +1 and the bottom two-terminal "and" gating circuit of $S_e$ is opened resulting in signal $e=+1$ in the third and sixth intervals. Finally, during the eighth interval, signals $q'$ and $d$ are both +1, and the top two-terminal "and" gating circuit of $S_e$ is opened resulting in signal $e=+1$ in the ninth interval.

Summarizing the operation, signal $e$ contains five +'s and three −'s having an average value of $$\frac{+5-3}{8}=+\tfrac{1}{4}$$

This value of ¼ is equal to one-half the average of the values of signal trains $p$ and $q'$ or one-half the difference between the values of signal trains $p$ and $q$.

The half-adder circuit of Fig. 7b is a mechanization of Equations 15, 16, 19 and 20 as derived from Case 2 of Table II. Since the mechanizations for $S_d$ and $Z_d$ in Fig. 7b are identical to those for Fig. 7a no further explanation is required. In addition, it will be noted that Equations 19 and 20 differ from Equations 17 and 18, respectively, only in the complementing of signal $d$. Accordingly, the mechanization of these equations in Fig. 7b is identical to the $S_e$ and $Z_e$ mechanizations in Fig. 7a except for the substitution of signals $d$ and $d'$ for signals $d'$ and $d$, respectively. In operation, the adders of Figs. 7a and 7b respond identically to like input signals, in the manner set forth above. In addition, the response of flip-flop D in both adders is identical for all input signals. The effect of the complementing of signal $d$ in Fig. 7b results in the complementing of signal $e$ when the input signals are different, that is in the second, third, fifth, sixth, eighth and ninth intervals of the example set forth above. In other words, the signal train $e$ produced by the adder of Fig. 7b in response to the input signal trains of the example would be +1, −1, +1, +1, −1, +1, +1, −1 which has an average value of $$\frac{+5-3}{8}$$

or +¼. As is apparent, both of the circuits of Figures 7a and 7b perform di-function half-addition in the manner previously defined.

An operational feature of adder 45 to be considered is that, assuming signal $q$ to have an average value of zero, for example, output signal $e$ will contain only one extra +1 value for each two extra +1 values contained in signal $p$, signal $p$ normally having alternate +1 and −1 values. Also, if signal $p$ contains an extra +1 value and signal $q$ contains an extra −1 value, owing to the subtraction, output signal $e$ will contain only one extra +1 value. This feature of the circuit's operation, that is, signal $e$ containing only one extra +1 value or −1 value for each two of such values contained in either of the input signals thereto, is a result of its scaling down or averaging effect on the two input signals.

Referring now to Fig. 8, there is illustrated deconverter 46 in block schematic form. Deconverter 46 produces a pair of output signals on its output conductors 47 and 48 which represent in voltage level form the same information as that possessed by the half-adder output signal $e$ in di-function form.

In particular, deconverter 46 produces a high voltage level on output conductor 47 each timing interval that signal $e$ contains an extra +1 value and produces a high voltage level on conductor 48 for each timing interval signal $e$ contains an extra −1 value, the extra +1 and −1 values occurring during a sequence of alternate +1 and −1 values representing an average di-function value of zero.

Deconverter 46 contains an electronic switch, such as flip-flop F, producing a pair of complementary output signals $f$ and $f'$ and, in order to accomplish the desired deconversion in the above stated manner, flip-flop F must be coupled to flip-flop E so as to form with it a two-stage shifting register circuit. With this done, each successive value of signal $e$ is, during the next timing interval, transferred to signal $f$ with the result that each two adjacent di-function values of signal $e$ may be compared. Thus, if signals $e$ and $f$ both have +1 values, a high voltage level is produced on conductor 47 to indicate thereby that signal $e$ contains an extra +1 value. On the other hand, if signals $e$ and $f$ each have a −1 value, a high voltage level is produced on output conductor 48 to indicate thereby the extra −1 value in signal $e$.

Although the circuitry to accomplish the above stated results may be drawn by inspection, a Table III, from which are derived the Boolean equations defining the circuitry of Fig. 8, is included below.

*Programming Table III*

| Line | Flip-Flop Signals | | To Generate | Output | |
|---|---|---|---|---|---|
|   | $e$ | $f$ | $f$ | +1 | −1 |
| 1 | +1 | +1 | +1 | 1 |   |
| 2 | +1 | −1 | +1 |   |   |
| 3 | −1 | +1 | −1 |   |   |
| 4 | −1 | −1 | −1 |   | 1 |
| Col | 1 | 2 | 3 | 4 | 5 |

In columns 1 and 2 of Table III are found the four possible combinations of values that signals $e$ and $f$ may have as indicated on lines 1 through 4, respectively.

In column 3 are found the values to be generated at the beginning of the next timing interval for signal $f$ in order to provide the stated shifting register operation. On each line signal $f$ is to be made equal, at the beginning of the next timing interval, to the value thereon given for signal $e$.

From column 3, the equations for the signals to be applied to the $S_f$ and $Z_f$ input conductors of flip-flop F may be written and simplified to:

$$S_f = e \cdot cl \qquad \text{(Eq. 21)}$$
$$Z_f = e' \cdot cl \qquad \text{(Eq. 22)}$$

In column 4, line 1 of Table II is found the program when, by definition, a $+1$ output signal is to appear on conductor 47 while in column 5, line 4, is found the program when, by definition, a $-1$ output signal is to appear on conductor 48. This is true since on line 1, $e$ and $f$ are both equal to $+1$ and on line 4, $e$ and $f$ are both equal to $-1$. The Boolean equations defining these output signals may be written and reduced to:

$$+1 = e \cdot f \qquad \text{(Eq. 23)}$$
$$-1 = e' \cdot f' \qquad \text{(Eq. 24)}$$

The circuitry illustrated in Fig. 8 is the mechanization of Equations 21 through 24, with Equation 23 being represented by "and" gating circuit 162 and Equation 24 being represented by "and" gating circuit 164. The operation of deconverter 46 may be most readily understood by reference to the composite group of signal waveforms illustrated in Fig. 9 and taken by way of example.

Here, timing signal 100 is again illustrated while output signal $e$, generally designated 150 in Fig. 9, is illustrated as is its complementary signal $e'$, generally designated 152 in Fig. 9. Signal $f$, generally designated 154 in Fig. 9 is identical to signal 150 but is delayed one timing interval to the right, as viewed from Fig. 9, from signal 150. In the same manner, signal $f'$, generally deisgnated 156 in Fig. 9, is identical to, but delayed one timing interval, from signal 152.

During the first timing interval, signals 150 and 154 are at their low and high voltage levels, respectively, with the result that the signal, generally designated 158 in Fig. 9, appearing on output conductor 47 is at its low voltage level owing to the action of the "and" gating circuit 162 to which signals 150 and 154 are applied. At the beginning of the second timing interval, each of signals 150 and 154 switch their conduction states and signal 158 still remains at its low voltage level.

However, during the third timing interval, signal 150 remains at its high voltage level and thus contains two consecutive high voltage levels. Signal 154 during the third timing interval is also at its high voltage level, which voltage level corresponds to the high voltage level of signal 150 appearing during the second timing interval. Thus, signal 158 contains a high voltage level during the third timing interval owing to the action of "and" gating circuit 162 and thus indicates on conductor 147, the extra $+1$ value of signal 150 produced during the third timing interval.

During the sixth and seventh timing intervals, signal 150 contains two adjacent low voltage levels with the result that signals 152 and 156 are at their high voltage levels during the seventh timing interval. This results in the signal, generally designated 160 in Fig. 9, appearing on output conductor 48, containing a high voltage level during this interval owing to the action of the "and" gating circuit 164 to which signals 152 and 156 are applied.

The action of deconverter 46 during the remaining timing intervals indicated in Fig. 9 may be readily understood from the description presented above.

As will be apparent to those skilled in the art, output signals 158 and 160 could readily be produced by a pair of flip-flops, respectively, rather than gating circuits 162 and 164 as is here illustrated. Such flip-flops would be triggered through gating circuits employing as input signals, signals 150, 152, 154 and 156 and their output signals would correspond in form to signals 158 and 160 but delayed one interval therefrom owing to the required triggering operation.

Having thus described in detail quantizer 34, adder 45 and deconverter 46, reference is again made to the operation of the system of Fig. 1. There is illustrated in Fig. 10 a composite group of signal waveforms, taken by way of example, of signals appearing at various points in the circuit of Fig. 1. Thus, timing signal 100 is again illustrated and output signal train $p$, generally designated 166 in Fig. 10, of quantizer 34 discloses extra $-1$ and $+1$ values during the seventh and seventeenth timing intervals, respectively, to indicate complete revolutions of shaft 20 in the negative and positive directions, respectively. Output signal train $q$, generally designated 168 in Fig. 10, of quantizer 42, disclosed extra $+1$ and $-1$ values during the fourth and fourteenth timing intervals, respectively, to indicate complete revolutions of shaft 36 in positive and negative directions, respectively. Signal train $q'$, generally designated 170 in Fig. 10, is complementary to signal train 168 and thus contains extra $-1$ and $+1$ values during the fourth and fourteenth timing intervals, respectively.

As has been stated, owing to the reverse connections of signals 168 and 170 to adder 45, complementary signal 170 is added to signal train 166 with the result that output signal $e$, again designated 150, of adder 45 is the di-function subtraction of signal train 168 from signal train 166. For purposes of explanation, signal train 150 is shown as aligned with trains 166 and 170, rather than displaced one timing interval as in the actual operation of the adders of Figs. 7a and 7b. As will be observed, during the 1st timing interval, signals 170 and 166 differ in value and for the purposes of this explanation, the sum thereof is arbitrarily set equal to a $+1$ value as indicated in signal train 150. With this first value established, signal train 150 contains during the remaining timing intervals that signals 170 and 166 differ in value, alternate $-1$ and $+1$ values.

By inspection, it is seen that the di-function addition of signal train 170 and 166 will produce in signal train 150, an extra $-1$ value during the seventh timing interval and an extra $+1$ value during the seventeenth timing interval. The extra $-1$ value of signal train 150 appearing during the seventh timing interval will, in the manner explained for the operation of deconverter 46, produce during this seventh timing interval, a high voltage level in the deconverter's output signal, again designated 160, appearing on output conductor 48. Also, the extra $+1$ value of signal train 150 will produce during the seventeenth timing interval a high voltage level in the deconverter's output signal, again designated 158, appearing on output conductor 47.

Differentiating circuit 47a will differentiate signal 158 and the differentiated result thereof is illustrated by the signal, generally designated 158a in Fig. 10, while the signal produced by the differentiation of signal 160 by differentiating circuit 48a is illustrated by the signal, generally designated 160a in Fig. 10.

In the manner explained previously for the operation of counter 49, the negative pulse appearing in signal 160a at the beginning of the eighth timing interval will cause counter 49 to reduce its binary count by one binary digit. If, for example, counter 49 contains four stages and has an initial count of 0000, as designated 172 in Fig. 10, this negative pulse of signal 160a will reduce the count of counter 49 by one binary digit to 1111.

The positive pulse of signal 158a appearing at the beginning of the seventeenth timing interval causes counter 49 to increase its count by one binary digit. Thus, the then existing count of 1111 will be increased by one binary digit to its initial value of 0000 as indicated in count 172.

As was stated previously, adder 45 produces an extra

+1 or −1 value in a series of alternate +1 and −1 output values only upon occurrence of two such extra values in its two input signals. Since signal train 168 is subtracted from signal train 166, the extra +1 value in signal train 168 appearing during the fourth timing interval taken in conjunction with the extra −1 value in signal train 166 appearing during the seventh timing interval, produces an extra −1 value in signal train 150 during the seventh timing interval. In the same manner, the extra −1 value of signal train 168 appearing during the fourteenth timing interval subtracted from the extra +1 value of signal train 166 appearing during the seventeenth timing interval produces an extra +1 value in signal train 150 during the seventeenth timing interval.

It is thus seen that signal train e of adder 45 contains an extra +1 or −1 value for each two complete angular rotations of shafts 20 and 36 relative to one another in positive or negative directions, respectively. Accordingly, the count indicated by counter 49 will be equal to only one-half of the total number of shaft revolutions marking the angular displacement between shafts 20 and 36. Thus, the count indicated by counter 46 should either be multiplied by a factor of two in order to represent the actual displacement between the two shafts or the normal two's place digit of the count be considered as the zero's place digit.

Also, since the count of counter 49 is one-half of the total number of complete revolutions of the difference in rotation between shafts 20 and 36, it is apparent that the count indicated thereby will be inaccurate whenever the angular displacement between the shafts is an odd number of revolutions. For example, the extra +1 value in signal train 168 appearing during the fourth timing interval signifies that shaft 36 has made one positive revolution with respect to shaft 20, which revolution is not indicated in count 172. During the period of time between the fourth and the eighth timing intervals, the count indicated by the counter is obviously inaccurate. However, at no time will the count of the counter when multiplied by a factor of two, be in error by more than one revolution of the actual difference in the relative displacement.

A definite relationship should be established between the number of counting stages of counter 49 and the maximum positive and negative counts to be indicated thereby so that the sign of its count, whether positive or negative, will be ascertainable. For example, if the value of the most significant digit of a four place counter is used to indicate the sign of the count, then the counter may count positively up to 0111 and may count negatively down to 1000, the 0 and 1 of the most significant place digit representing positive and negative counts, respectively. With this arrangement, any count between and including 0001 and 0111 would be positive while any count between and including 1111 and 1000 would be negative.

The maximum angular displacement in a positive direction between shafts 20 and 36 should not exceed an amount such as to produce a count greater than, under the above given example, 0111. In a like manner, their more negative displacements should not produce a count less than 1000. By observing these restrictions, it is possible for the count to indicate at all times the relative angular displacement between the shafts. As is apparent, the number of stages of counter 49 may be increased to the point that a relatively great shaft rotational difference may be indicated.

In summary, therefore, it is seen that the computer and indicator system of Fig. 1 provides a new and novel technique for representing magnitudes of a variable in a non-numerical form, herein referred to as di-function form. Di-function information is achieved by an electrical signal train including a combination of first and second signals representing units of the integral of the variable in positive and negative directions, respectively. The individual signals of the train are marked by a timing signal source which produces periodic timing signals marking equal timing intervals, there being one signal of the train for each timing interval.

The information represented by a di-function signal train may be considered from two aspects. Firstly, consider the average value of the information represented, that is the value $$\frac{N_+ - N_-}{N_+ + N_-}$$

where $N_+$ is the number of positive unit signals over a time period equal to an integral number of timing intervals and $N_-$ is the number of other or negative unit signals during the period. It should be apparent that this average value, in fact, is representative of the average of the integral of the variable over the time period divided by the time period or, in other words, the average value of the variable over the time period.

For example, consider the quantizers of Fig. 1 which represent the velocity of a rotating shaft. In this instance, each signal of di-function signal train represents a unit integral of the velocity or, in other words, the displacement of the shaft. The average value of the signal train over any time period is then representative of the displacement during that period divided by the period, or the average velocity.

At this point it should be noted that the average value represented by a di-function signal train can never have an absolute magnitude greater than one. For this reason, the average value of the di-function signal train produced by the quantizer is not equal to the actual velocity of its associated shaft, but to the ratio of this actual velocity to a predetermined maximum velocity.

Consider now the other aspect of the information represented by a di-function signal train. Since each signal of the train represents a unit integral of the variable, the summation of the units represented by the train over a given time period is, therefore, representative of the average integral over the time period. For example, in the quantizer, the summation of the units of displacement represented by the output di-function signal train over a time period represents the total displacement of the shaft. It is this total displacement which is utilized by deconverter 46 and up-down counter 49, since deconverter 46, in effect eliminates all consecutive positive and negative increments, while counter 49 balances out displacements in one direction with subsequent displacements in the other direction.

The adders of Figs. 7a and 7b employ the same basic techniques to represent a variable in di-function form. In the case of the adders, however, the variable to be represented is the sum of or difference between two independent variables already represented in di-function form. Again, the adder produces a combination of first and second signals representing unit integrals of the variable in positive and negative directions. Again the average value of the adder output di-function train is representative of the average value of the variable, while the summation of the integrals represented by the train is the average integral. In fact it is this summation which is utilized by deconverter 46 and counter 49 to produce a numerical indication of the total relative displacement between shafts 20 and 36.

Referring now to Fig. 11, there is illustrated a unidirectional di-function quantizer 170 in conjunction with the shaft 20 and disc 22 arrangement illustrated in Fig. 1. However, in this embodiment, shaft 20 rotates only in one direction, the clockwise one, which rotation is converted by quantizer 170 into a di-function output signal.

Since shaft 20, by definition, rotates in only one direction, only two brushes, G and H, are required while within quantizer 170 are found a principle flip-flop U, producing the quantizer output signals $u$ and $u'$ and two programming or memory flip-flops R and S producing signals $r$, $r'$ and $s$, $s'$, respectively. Flip-flops R and S serve the same function as did flip-flops I and J in quantizer 34 in that their conduction states are utilized to "remember" the previous contact sequences between commutator segment 24 and brushes G and H.

Here, the sequence of contacts between segment 24 and brushes G and H, in order, is arbitrarily defined as one revolution of shaft 20. As was the case for quantizer 34, the principle flip-flop U is to be normally triggered into its other conduction state at the beginning of each timing interval so that signal $u$ contains alternate $+1$ and $-1$ di-function values. However, after completion of each shaft revolution, defined above as the clockwise brush sequence G to H, triggering is to be withheld such that signal $u$ will contain two consecutive $+1$ values, the extra $+1$ value indicating a single shaft revolution.

The specific circuitry of Fig. 11 for accomplishing the above stated results is derived from a group of Boolean equations which, in turn, may be written from the programming table found below as Table IV.

*Programming table IV*

| Line | Brush | | Contents | | | To Generate | | | Output +1 |
|---|---|---|---|---|---|---|---|---|---|
| | $g$ | $h$ | $u$ | $r$ | $s$ | $u$ | $r$ | $s$ | |
| 1 | | | $\{^{+1}_{-1}\}$ | $-1$ | $-1$ | | | | |
| 2 | 1 | | $\{^{+1}_{-1}\}$ | $-1$ | $-1$ | | $+1$ | | |
| 3 | | | $\{^{+1}_{-1}\}$ | $+1$ | $-1$ | | | | |
| 4 | | 1 | $-1$ | $+1$ | $-1$ | | | $+1$ | |
| 5 | | 1 | $+1$ | $+1$ | $-1$ | | | | |
| 6 | | | $+1$ | $+1$ | $+1$ | | $-1$ | $-1$ | 1 |
| 7 | | | $\{^{+1}_{-1}\}$ | $-1$ | $-1$ | | | | |
| Col | 1 | 2 | 3 | 4 | 5 | 6 | 7 | 8 | 9 |

On line 1 of Table IV, it is assumed that segment 24 lies on the periphery of disc 20 outside of brushes G and H in the manner indicated in Fig. 11. During this position of segment 24, signal $u$ is to have alternate $+1$ and $-1$ values while signals $r$ and $s$ are both equal to $-1$.

Upon the subsequent rotation of shaft 20, brush G will be contacted, as on line 2, with signal $g$ being equal to 1. Upon this occurrence, as indicated in column 7, line 2, flip-flop R is to be triggered at the beginning of the next timing interval into producing $r=+1$, which program is indicated on line 3.

Upon shaft 20 continuing to rotate, brush H will next be contacted and this contact may be initially made when $u$ is equal to $-1$, as on line 4, or when $u$ is equal to $+1$, as on line 5. Regardless of whether $u$ equals $+1$ or $-1$, $u$ is complemented at the beginning of the next timing interval as in all of the previous operations.

Therefore, if $u=-1$ at the time of this initial contact, $u$ normally becomes equal to $+1$ at the next timing interval. At the same time, $s=+1$ is to be generated, as on line 4, column 8, during the next following timing interval so that the system changes from the combination of signals on line 4 to the combination of signals on line 6 of the table. On the other hand, if $u=+1$ at the time of the initial contact, $u$ normally becomes equal to $-1$ at the next timing interval. As in the case of quantizer 34, it is preferable at this point to do nothing with flip-flop S in order to assure that $r$ and $s$ both become $+1$ at the time that $u$ becomes $+1$. Accordingly, the combination of signals on line 5 is transformed to the combination of signals of line 4. Thereafter, the system operates in the manner set forth above to transform the signals of line 4 to the signals of line 6.

The program indicated on line 6, resulting from the "to generate" column on line 4, is a transitory one lasting for only one timing interval and is automatically returned to the program set forth on line 7 (identical to line 1) when segment 24 again lies without the brushes on the periphery of disc 22. This return is effected by generating, during the timing interval following the transitory program, $r$ and $s$ both equal to a $-1$ as indicated on line 6, columns 7 and 8.

It is thus seen that, regardless of whether $u$ is $+1$ or $-1$ at the time of the initial contact between segment 24 and brush H, the program proceeds through a cycle which produces two consecutive $+$'s in $u$, namely, the $+1$ of line 6 and the $+1$ of line 7. Thereafter, the cycle begins again as in line 1 of Table IV.

From Table IV, the Boolean equations representing the circuitry for performing the electrical results therein set forth may be written and reduced to $$S_r = g \cdot r' \cdot s' \cdot cl \quad \text{(Eq. 27)}$$
$$Z_r = u \cdot r \cdot s \cdot cl \quad \text{(Eq. 28)}$$
$$S_s = h \cdot u' \cdot r \cdot s' \cdot cl \quad \text{(Eq. 29)}$$
$$Z_s = u \cdot r \cdot s \cdot cl \quad \text{(Eq. 30)}$$
$$S_u = u' \cdot (r' + s') \cdot cl \quad \text{(Eq. 31)}$$
$$Z_u = u \cdot (r' + s') \cdot cl \quad \text{(Eq. 32)}$$

As will be observed, Equations 31 and 32 for $S_u$ and $Z_u$, respectively, are similar to Equations 13 and 14 for the $S_p$ and $Z_p$ signals of quantizer 34 and may be written by inspection in the same manner.

Quantizer 170 is a mechanization of Equations 27 through 32. Thus, Equations 31 and 32 for $S_u$ and $Z_u$, respectively, are mechanized by two three-terminal "and" gating circuits and a two-terminal "or" gating circuit, as were Equations 13 and 14 of quantizer 34. On the other hand, each of Equations 27, 28 and 30, which define a single logical "and" operation involving four factors, is mechanized by a single four-terminal "and" gating circuit. In this connection, it should be noted that Equation 28 for $Z_r$ is identical to Equation 30 for $Z_s$. For purposes of circuit simplicity, a common gating circuit is utilized to mechanize both of these equations. Equation 29 is mechanized by a single five-terminal "and" gating circuit.

In operation, assume that signals $r$ and $s$ are initially $-1$, as indicated in line 1 of Table IV, and that segment 24 is approaching brush G. During this time, the "or" gating circuit of Fig. 11 will be open and flip-flop U will be triggered by each signal $cl$ into alternate states. On the other hand the other hand the "and" gating circuits mechanizing Equations 27 and 29 will remain closed, since the voltage levels on the brushes are low, and signals $r$ and $s$ remain $-1$.

As soon as segment 24 contacts brush G, signal $g$ rises to $+1$ and the next signal $cl$ opens the gating circuit for $S_r$; as indicated by line 2 of Table IV, thereby to change signal $r$ to $+1$, as indicated by line 3 of the table. Signal $s$ remains $-1$ and, therefore, signal $u$ still alternates between $+1$ and $-1$. This mode of operation continues until segment 24 contacts brush H at which time signal $h$ rises to $+1$.

As noted above, the next sequence of signals is dependent upon the state of flip-flop U. If $u=-1$ as indicated by line 4 of Table IV, then the "and" gating circuit for $S_s$ is opened and the next signal $cl$ sets $s$ to $+1$. At the same time $u$ is changed to $+1$ and the sequence of signals is as shown on line 6 of the table. With signals $u$, $r$ and $s$ all at $+1$, the gating circuit for $Z_r$ and $Z_s$ is opened and the next signal $cl$ sets $r$ and $s$ to $-1$. At this time, however, since $r$ and $s$ are both $+1$, the "or" gating circuit is closed and no triggering signal is applied to flip-flop U. Therefore, $u$ remains $+1$ for a second timing interval indicating completion of one resolution.

If $u=+1$ as in line 5 of Table IV at the time of the initial contact between segment 24 and brush H, then the gating circuit for $S_s$ remains closed and signal $s$ remains $-1$. On the other hand, since the "or" gating circuit remains open ($s=-1$), $u$ is changed to $-1$, and the sequence of signals is as shown in line 4 of the table.

Since segment 24 remains in contact with brush H for two timing intervals, the operation of quantizer 170 proceeds in the manner set forth above.

It is, therefore, seen that unidirectional quantizer 170 of Fig. 11 follows the same basic principles and mode of operation as bi-directional quantizer 34 to generate a di-function signal train representing the velocity of shaft 20. Stated differently, quantizer 170 also samples the integral of velocity, that is the displacement of shaft 20 and generates signals representing unit integrals or displacements in the positive and negative directions. Again the average of the displacements represented by the di-function signal train over a time period is equal to the ratio of the magnitude of the velocity of shaft 20 to a predetermined maximum velocity. As will be apparent, quantizer 170 is capable of producing a di-function output signal representing other types of unidirectional movement other than the angular movements herein illustrated. Also circuitry could have been derived from defining one shaft revolution as taking place between brushes H and G in which case an extra $u=+1$ would be produced upon each occurrence.

The unidirectional di-functional quantizer of Fig. 11 may obviously be utilized in the computer and indicator system of Fig. 1 if each of the shafts therein have only one direction of rotation.

I claim:

1. A device for computing and indicating the relative displacement between first and second movable members, said device comprising: first and second means coupled to the first and second movable members, respectively, for producing first and second signal trains, respectively, each of said signal trains including a plurality of first signals each representing a first number and at least one second signal representing a second number, the average value of the numbers represented by the signals of said first and second train during a predetermined time interval representing the magnitudes of movements of the first and second movable members, respectively, during said time interval; adder means for combining said first and second signal trains to produce a third signal train having said first and second signals representing said first and second numbers, respectively, the average of the numbers represented by said third signal train being a function of the difference in averages of said first and second signal trains; deconverter means for deconverting said third signal train into an output signal in pulse form representing the relative movement between the first and second movable members; and indicator means responsive to said output signal for producing a numerical indication of the displacement between the first and second movable members.

2. The device of claim 1 wherein each of said first and second means includes an electronic switching means responsive to first and second input signals for producing an output signal having first and second voltage levels, respectively, representing said first and second numbers, respectively, normally operable means for applying first and second input signals alternately to said switching means, and means for rendering said normally operable means inoperative to apply one of said input signals upon a predetermined magnitude of movement of its associated movable member.

3. The device of claim 2 wherein said adder means includes an adder electronic switching means responsive to first and second input signals for producing an output signal having first and second output voltage levels, respectively, representing said first and second numbers, respectively, means responsive to the simultaneous appearance of said first voltage level in said first and second signal trains for applying a first input signal to said adder switching means, means responsive to the simultaneous appearance of said second voltage level in said first and second signal trains for applying a second input signal to said adder switching means, and means responsive to successive simultaneous appearances of different voltage levels in said first and second signal trains for applying alternate first and second signals to said adder switching means.

4. The device of claim 3 wherein said deconverter means includes deconverter electronic switching means responsive to first and second input signals for producing an output signal having first and second output voltage levels, means responsive to the first and second voltage levels in said third signal train for applying first and second signals, respectively, to said deconverter switching means whereby the sequence of voltage levels produced by said deconverter switching means forms a fourth signal train, each of the voltage levels of said fourth signal train lagging by one voltage level its corresponding voltage levels in said third signal train, means responsive to the simultaneous appearance of the first voltage level in said third and fourth signal trains for producing a first output pulse; and means responsive to the simultaneous appearance of the second voltage level in said third and fourth di-function signal trains for producing a second output pulse.

5. The device of claim 4 wherein said indicator means includes an up-down binary counter, said binary counter being responsive to each first output pulse produced by said deconverter means for counting one binary digit in one direction and responsive to each second output pulse produced by said deconverter means for counting one binary digit in the other direction.

6. A device for representing the magnitude of a function of the movement of a movable member as a non-numerical information carrying electrical output signal train, said device comprising: a timing signal source for generating periodic timing signals having a predetermined period; and means, coupled to said timing signal source and responsive to the movement of the movable member, for generating an electrical output signal train having a plurality of first signals and at least one second signal, a single signal being generated for each period of said signal source, said first and second signals representing increments of movement of the member in first and second directions, respectively, the average of the increments represented by the signals in said output signal train being equal to the magnitude of the function, said means including apparatus operable in the absence of motion of said moveable element for successively producing alternate first and second signals in successive periods of said signal source.

7. A device for representing as an electrical di-function signal the magnitude of a function of the relative position of a movable member with respect to a reference point, said member being movable in at least one of first and second directions, said device comprising: a timing signal source for generating periodic timing signals having a predetermined period; and signal generating means, coupled to said timing signal source and responsive to the position of the movable member relative to the reference point, for generating an electrical output signal train including, during each predetermined period, a single one of first and second signals respectively representing increments of magnitude in the first and second directions of the relative position, the average of the increments represented by the signals in said output signal train being equal to the magnitude of the function, said means including apparatus operable in the absence of motion of said moveable element for successively producing alternate first and second signals in successive periods of said signal source.

8. A device for representing the relative difference in movement between a pair of movable members as an electrical signal train, said device comprising: a timing signal source for generating periodic timing signals having a predetermined period; and signal generating means, coupled to said timing signal source and responsive to the movements of the movable members, for generating an electrical signal train including, during each predetermined period, a single one of first and second signals representing increments of magnitude of relative movement in first and second directions, respectively, the average of the increments represented by the signals in said output signal train being equal to the relative difference in movement, said signal generating means including apparatus operable in the absence of relative difference of movement of said pair of members for producing alternate first and second signals in successive periods of said timing signal source.

9. In combination: first and second movable members, each of said members having positive and negative directions of movement; first means for producing a first output signal train representing the movement of said first member, said signal train including a plurality of first signals each representing an incremental movement in one of said directions and at least one second signal representing an incremental movement in the other of said directions, the direction and magnitude of movement of said first movable member being represented by the sign of the average and the average, respectively, of the increments represented by said first output signal train; second means for producing a second output signal train representing the movement of said second member, said signal train including a plurality of second signals each representing an incremental movement in one of said directions and at least one second signal representing an incremental movement in the other of said direction, the direction and magnitude of movement of said second movable member being represented by the sign of the average and the average, respectively, of the increments represented by said second output signal train; and means for combining said first and second signal trains to produce a third output signal train representing the difference in the movements represented by the first and second signal trains.

10. A device for indicating the relative movement between first and second movable members, said device comprising: first and second means responsive to the movements of the first and second movable members, respectively, for producing first and second synchronized signal trains, respectively, each signal train including a plurality of first and second signals representing first and second numbers, respectively, the averages of the numbers represented by said first and second signal trains representing the movements of the first and second movable members, respectively; and means for combining said first and second signal trains to produce an output signal train synchronized with said first and second signal trains and having a plurality of said first and second signals respectively representing first and second numbers, the average of the numbers represented by said output signal train corresponding to the difference in the magnitudes of movement of the movable members.

11. A device for use with first and second movable members, said device comprising: means for electrically representing a function of the movement of the first and second movable members as first and second synchronized signal trains, respectively, each signal train including a plurality of first and second signals representing first and second numbers, respectively; and means combining said first and second signal trains to produce a third signal train synchronized with said first and second trains and representing the average of the functions represented by said first and second signal trains.

12. In combination: first means for generating a first signal train representing a first variable, said first signal train including a first combination of first and second signals representing first and second numbers, respectively, the average of the numbers represented by said first combination being equal to the value of the first variable; second means for generating a second signal train synchronized with said first signal train and representing a second variable, said second signal train including a second combination of said first and second signals, the average of the numbers represented by said second combination being equal to the value of the second variable; and means for combining said first and second signal trains to produce a third signal train synchronized with said first and second signal trains and including a third combination of said first and second signals, the average of the numbers represented by said third combination being equal to one half the sum of the first and second variables.

13. A computer and indicator for numerically indicating the relative displacement between first and second movable members, said indicator comprising: first and second means responsive to the displacement of the first and second movable members, respectively, for producing first and second synchronized signal trains representing the displacements of the first and second members, respectively, each signal train including a combination of +1 and −1 representing signals; means for combining said first and second signal trains to produce a third signal train synchronized with said first and second trains and representing a function of the difference in the displacements represented by said first and second signal trains, said third signal train including another combination of said +1 and −1 representing signals; and means conductively coupled to the last-named means for producing a numerical indication of the function represented by said third signal train.

14. A device for representing the magnitude of a function of the movement of a movable member as a non-numerical information carrying electrical output signal train, said device comprising: a timing signal source for generating periodic timing signals having a predetermined period; and means, coupled to said timing signal source and responsive to the movement of the movable member, for generating an electrical output signal train having a combination of +1 and −1 representing signals, a single signal for each period of said signal source, the average of the numbers represented by the signals in said output signal train being equal to the magnitude of the function, said means including apparatus automatically operable in the absence of motion of said moveable member for successively producing alternate +1 and −1 representing signals in successive periods of said timing signal source.

15. A device for use with a member movable in at least one of first and second directions, said device comprising: signal generating means, coupled to said moveable member and normally operable when said moveable member is stationary, for producing an electrical signal train including regularly occurring alternate first and second signals representing a unit of movement in said first and second directions, respectively; and means, coupled to said signal generating means and responsive to each said predetermined magnitude of movement in said one direction, for rendering said signal generating means inoperable to produce the next regularly occurring signal representing movement in the other of said first and second directions.

16. A device for use with a shaft rotatable in at least one of positive and negative directions, said device comprising: first signal generating means having first and second output conductors and responsive to a predetermined magnitude of rotation of the shaft in the one direction for producing consecutive signals, in order, on said first and second output conductors; and second signal generating means for producing an electrical output signal train representing the magnitude of rotation of the shaft, said second signal generating means including first means normally operable in a first mode of operation to produce alternate first and second signals representing units of rotation in the positive and negative directions and actuable to operate in a second mode of operation to produce two consecutive signals each representing units of rotation in the one direction, and second means, responsive to each appearance of the consecutive signals in order on said first and second output conductors, for actuating said first means to operate in said second mode of operation.

17. A device for electronically representing the movement of a movable element, said device comprising: actuable means responsive to first and second input signals for producing first and second voltage level output signals, respectively; normally operable means for applying alternate first and second input signals to said actuable means at regular timing intervals whereby said first and second output voltage levels appear alternately during successive timing intervals; and means responsive to each predetermined magnitude of movement of the element for rendering said normally operable means inoperative for at least one timing interval to apply said first input signal to said actuable means whereby said actuable means continues to produce said second level output signal initiated by the immediately prior applied second output signal, said second level output signal thus appearing for two consecutive regular timing intervals.

18. A device for electronically representing the movement of an element having at least first and second directions of movement, said device comprising: actuable means responsive to first and second input signals for producing first and second voltage level output signals; normally operable means for applying alternate first and second input signals to said actuable means at regular timing intervals whereby said actuable means produces said first and second output signals alternately during successive timing intervals; and means responsive to each predetermined magnitude of movement of the element in the first and second directions for rendering said normally operable means inoperative for at least one timing interval for applying said first and second input signals, respectively, to said actuable means whereby said second and said first voltage levels, respectively, are produced by said actuable means for two consecutive timing intervals by said actuable means continuing to produce the second level output signal initiated by the immediately prior applied second input signal and by continuing to produce the first level output signal initiated by the immediately prior applied first input signal, respectively.

19. A device for use with a movable member, said device comprising: means for producing an output signal having a series of alternate first and second voltage levels appearing during a series of consecutive timing intervals, respectively; and means coupled to the first-named means and responsive to each predetermined magnitude of movement of said movable member for maintaining said output signal at said first voltage level for two consecutive timing intervals whereby said output signal represents the movement of said movable member, said output signal having a single one of said first and second voltage levels during each of said consecutive timing intervals.

20. A device for use with a member movable in first and second directions, said device comprising: means for producing a signal having a series of alternate first and second voltage levels during a series of consecutive timing intervals, respectively; and means coupled to the first-named means and responsive to each predetermined magnitude of movement of said movable member in said first and second directions for maintaining said signal at said first and second voltage levels, respectively, for at least two consecutive timing intervals, said output signal having a single one of said first and second voltage levels during each of said consecutive timing intervals.

21. A device for adding the series of instantaneous values of a first input signal to the series of corresponding instantaneous values of a second input signal, each of said values being represented by either a relatively high or a relatively low voltage level, said device comprising: an adder flip-flop operable in response to the application of first and second signals for producing an output signal having relatively high and low voltage levels, respectively; means for applying a first signal to said adder flip-flop in response to each simultaneous appearance of a high voltage level in the first and second input signals; means for applying a second signal to said adder flip-flop in response to each simultaneous appearance of a low voltage level in the first and second input signals; a memory flip-flop responsive to successively applied signals for triggering alternately into first and second conduction states; means responsive to each difference in the corresponding instantaneous values of the first and second input signals for applying a signal to said memory flip-flop; means operable in response to the first conduction state of said memory flip-flop and a simultaneous difference in the corresponding values of the first and second input signals for applying a first signal to said adder flip-flop; and means responsive to the second conduction state of said memory flip-flop and a simultaneous difference in the corresponding values of the first and second input signals for applying a second signal to said adder flip-flop.

22. A device for producing an output signal representing the average of the values of a pair of input signals, each of said pair of input signals comprising a series of alternate relatively high and low voltage levels, representing first and second values, respectively, said device comprising: first actuable means operable in response to application of first and second signals for producing an output signal having relatively high and low output voltage levels, respectively, representing first and second values, respectively; means responsive to the simultaneous appearance of a high voltage level in the pair of input signals for applying a first signal to said first actuable means; means responsive to the simultaneous appearance of a low voltage level in the pair of input signals for applying a second signal to said first actuable means; second actuable means operable in response to successively different values of the pair of input signals for producing an output signal having alternate first and second voltage levels; and means responsive to the first and second voltage levels of the output signal produced by said second actuable means and different values of the pair of input signals for applying first and second input signals, respectively, to said first actuable means whereby the average of the values represented by the high and low voltage levels produced by said first actuable means represents the average of the values of the pair of input signals.

23. A device for averaging the values of a pair of input signal trains having corresponding pluralities of input signals, each input signal representing either a +1 value or a —1 value, said device comprising: actuable means having first and second input terminals and responsive to signals applied to said first and second input terminals for producing output signals representing +1 and —1 values, respectively; means, responsive to the input signal train, for applying a signal to said first input terminal when each pair of corresponding signals of said trains are simultaneously at their +1 value; means, responsive to the input signal trains, for applying a signal to said second input terminal when each pair of corresponding signals of said trains are simultaneously at their —1 value; means, responsive to each successive simultaneous difference in the values of a pair of corresponding signals of said trains, for assuming alternate first and second conduction states; means operable in response to the first conduction state of the last-named means and a simultaneous difference in the values of a pair of corresponding signals of said trains for applying a signal to said first input terminal; and means operable in response to the second conduction state of said last-named means and a simultaneous difference in the values of a pair of corresponding signals of said trains for applying a signal to said second input terminal.

24. In combination: means for producing first and second signal trains representing first and second values, respectively, each signal train including a plurality of signals each representing either a first number or a second number, the value represented by each train being equal to the average of the numbers represented by its signals, and means for combining said first and second signal trains to produce a third signal train representing the average of the values of said first and second signal trains, said third signal train including a corresponding plurality of signals each representing said first number or said second number.

25. In combination: means for producing first and second signal trains representing first and second values, respectively, each signal train including a predetermined plurality of signals each representing either a first number or a second number, the value represented by each train being equal to the average of the numbers represented by its signals; actuable means for producing an output signal having either a relatively high voltage level for a predetermined period and representing said first number or a relatively low voltage level for said predetermined period and representing said second number; and means, responsive to said first and second signal trains, for actuating said actuable means to produce a composite signal having $N_1$ relatively high level signals and $N_2$ relatively low level signals, where $N_1$ plus $N_2$ is equal to said predetermined plurality and the average of the numbers represented by said composite signal is equal to one-half the sum of said first and second values.

26. A device for use with first and second devices producing first and second di-function signals, respectively, each of said first and second di-function signals comprising a series of alternate high and low voltage levels, each of the voltage levels normally appearing for one timing interval and occasionally appearing for two timing intervals, said device comprising: means operable in response to first and second input signals for producing alternate high and low voltage levels; normally operable means for applying alternate first and second input signals to the first-named means; means for rendering said normally operable means inoperative for applying a first input signal to said first-named means in response to each two instances the first and second di-function signals contain a high voltage level for two timing intervals; and means for rendering said normally operable means inoperative for applying a second input signal to said first-named means in response to each two instances the first and second di-function signals contain a low voltage level appearing for two timing intervals.

27. A device for adding first and second series of signals each signal occurring during a predetermined time interval and representing either $+1$ or $-1$, corresponding signals of said series representing identical numbers during some timing intervals and representing different numbers during other first, second, third, fourth, ... $n$th designated timing intervals, said device comprising: actuable means for producing during each timing interval either a first output signal or a second output signal representing either $+1$ or $-1$, respectively; means for actuating said actuable means to produce a $+1$ signal during each timing interval the corresponding signals of said series are simultaneously at their $+1$ values; means for actuating said actuable means to produce a $-1$ signal during each timing interval the corresponding signals of said series are simultaneously at their $-1$ values; means for actuating said actuable means to produce a $+1$ signal during the first, third, fifth, ... $(n-1)$th designated timing intervals; and means for actuating said actuable means to produce a $-1$ signal during the second, fourth, sixth ... $n$th designated timing intervals.

28. A device for averaging successive pair of applied input signals having either of the values of $+1$ and $-1$, said device comprising: a flip-flop having first and second input terminals and responsive to signals applied to said first and second input terminals for producing output signals representing the values of $+1$ and $-1$, respectively; means responsive to each pair of $+1$ valued applied input signals for applying a signal to said first input terminal; means responsive to each pair of $-1$ valued applied input signals for applying a signal to said second input terminal; and means responsive to each successive pair of different valued applied input signals for applying a signal alternately to said first and second input terminals.

29. A device for averaging successive pairs of applied input signals, each of the input signals having either of the values of $+1$ and $-1$, said device comprising: selectively operable means for producing first and second output signals respectively representing the values $+1$ and $-1$; means for actuating said selectively operable means to produce an output signal having a $+1$ value whenever both of a pair of applied input signals have values of $+1$; means for actuating said selectively operable means to produce an output signal having a $-1$ value whenever both of a pair of applied input signals have values of $-1$; and means for actuating said selectively operable means to produce an output signal having alternate values of $+1$ and $-1$ for each successive pair of different valued applied input signals.

30. A device for producing an output signal whose average value is one-half the sum of the average values of a pair of input signals, each of said input signals comprising a series of alternate relatively high and low voltage levels, each of said voltage levels appearing for an integral number of timing intervals, said device comprising: means responsive to first and second signals for producing an output signal having first and second output voltage levels, respectively; means for applying a first signal to the first-named means at the beginning of each timing interval that the pair of input signals are simultaneously at their high voltage levels; means for applying a second signal to said first-named means at the beginning of each timing interval that the pair of input signals are simultaneously at their low voltage levels; and means for applying first and second signals to said first-named means at the beginning of alternate timing intervals, respectively, when the voltage levels of the pair of input signals simultaneously differ.

31. A device for adding a first pair of complementary input signals $p$ and $p'$ to a second pair of complementary input signals $q$ and $q'$ each of signals $p$, $p'$, $q$, and $q'$ comprising alternate relatively high and low voltage levels, said device comprising: a programming flip-flop having first and second input terminals and producing a pair of complementary output signals $d$ and $d'$, said programming flip-flop being responsive to signals applied to said first input terminal for producing relatively high and low voltage levels in said output signals $d$ and $d'$, respectively, and to signals applied to said second input terminal for producing relatively low and high voltage levels in signals $d$ and $d'$, respectively; a first gating network, responsive to the input signals, for applying a signal to said first input terminal whenever signal $d'$ is at its high voltage level and signals $p$ and $q$ are simultaneously at different voltage levels; a second gating network, responsive to the input signals, for applying a signal to said second input terminal when ever signal $d$ is at its high voltage level and signals $p$ and $q$ are simultaneously at different voltage levels; an adder flip-flop having first and second input conductors and producing a pair of complementary output signals $e$ and $e'$, said adder flip-flop being responsive to signals applied to said first input conductor for producing relatively high and low voltage levels in output signals $e$ and $e'$, respectively, and to signals applied to said second input conductor for producing relatively low and high voltage levels in output signals $e$ and $e'$, respectively; a third gating network, responsive to the input signals and to the output signals from said programming flip-flop, for applying a signal to said first first input conductor whenever any two of the signals $p$, $q$ and $d$ are simultaneously at their high voltage levels; and a fourth gating network, responsive to the input signals and to the output signals from said programming flip-flop, for applying a signal to said second input conductor whenever any two of the signals $p'$, $q'$, and $d'$ are simultaneously at their high voltage levels whereby the average value of output signal $e$ is one-half of the sum of the average values of input signals $p$ and $q$.

32. A device for adding a first pair of complementary input signals $p$ and $p'$ to a second pair of complementary input signals $q$ and $q'$, each of signals $p$, $p'$, $q$, and $q'$ comprising alternate relatively high and low voltage levels, said device comprising: a programming flip-flop having first and second input terminals and producing a pair of complementary output signals $d$ and $d'$, said programming flip-flop being responsive to signals applied to said first input terminal for producing relatively high and low voltage levels in output signals $d$ and $d'$, respectively, and to signals applied to said second input terminal for producing relatively low and high voltage levels in signals $d$ and $d'$, respectively; a first gating network, responsive to the input signals, for applying a signal to said first input terminal whenever signal $d'$ is at its high voltage level and signals $p$ and $q$ are simultaneously at different voltage levels; a second gating network, responsive to the input signals, for applying a signal to said second input terminal whenever signal $d$ is at its high voltage level and signals $p$ and $q$ are simultaneously at different voltage levels; an adder flip-flop having first and second input conductors and producing a pair of complementary output signals $e$ and $e'$, said adder flip-flop being responsive to signals applied to said first input conductor for producing relatively high and low voltage levels in the output signals $e$ and $e'$, respectively, and to signals applied to said second input conductor for producing relatively low and high voltage levels in the output signals $e$ and $e'$, respectively; a third gating network, responsive to the input signals and the signals from said programming flip-flop, for applying a signal to said first input conductor whenever any two of signals $p$, $q$ and $d'$ are simultaneously at their high voltage levels; and a fourth gating network, responsive to the input signals and the signals from said programming flip-flops, for applying a signal to said second input conductor whenever any two of signals $p'$, $q'$ and $d$ are simultaneously at their high voltage levels whereby the average value of output signal $e$ is one-half of the sum of the average values of input signals $p$ and $q$.

33. A device for representing the average of the values represented by first and second corresponding input signal trains as a corresponding electrical output signal train, the first signal train including a first combination of first and second input signals occurring during successive timing intervals and representing first and second numbers, respectively, the second signal train including a second combination of the first and second input signals, the signals in the second train corresponding to the signals in the first train, respectively, said device comprising: first means, responsive to the input signal trains, for producing a first output signal representing one of the first and second numbers during each timing interval that first input signals occur simultaneously in the input signal trains; second means, responsive to the input signal trains, for producing a second output signal representing the other of the first and second numbers during each timing interval that second input signals occur simultaneously in the input signal trains; and third means for successively producing alternate first and second signals during successive intervals that different input signals occur simultaneously in the input signal trains, a single one of said first and second signals being produced in each of said successive intervals.

34. A device for representing the average of the values represented by first and second corresponding input signal trains as a corresponding electrical output signal train, the first signal train including a first combination of first and second input signals occurring during successive timing intervals and representing first and second numbers, respectively, the second signal train including a second combination of the first and second input signals, the signals in the second train corresponding to the signals in the first train, respectively, said device comprising: first means, responsive to the input signal trains, for producing a first output signal representing the first number during each timing interval that first input signals occur simultaneously in the input signal trains; second means, responsive to the input signal trains, for producing a second output signal representing the second number during each timing interval that second input signals occur simultaneously in the input signal trains; and third means for producing alternate first and second signals during successive intervals that different input signals occur simultaneously in the input signal trains, a single one of said first and second signals being produced in each of said successive intervals.

35. A device for deconverting a di-function signal and its complementary di-function signal, each of said signals comprising alternate high and low voltage levels, each of said levels appearing for an integral number of timing intervals, said device comprising: means for delaying the di-function signal and the complementary di-function signal one timing interval; first and second "and" gating means, each of said gating means having first and second input terminals and responsive to a high voltage level applied simultaneously to said first and second input terminals for producing a high output voltage level; means for applying the di-function signal and the first delayed di-function signal to the first and second input terminals of said first gating means, respectively, whereby said first gating means produces a high output voltage level for each two consecutive high voltage levels in the di-function signal; and means for applying the complementary di-function signal and the delayed complementary di-function signal to the first and second terminals, respectively, of the said second gating means, respectively, whereby said second gating means produces a high output voltage level for each two consecutive low voltage levels in the di-function signal.

36. A device for changing the information contained in a di-function signal having alternate relatively high and low voltage levels into information in pulse form, said device comprising: means for delaying the di-function signal for a predetermined time interval; first gating means operable in response to high voltage levels appearing simultaneously in the di-function signal and the delayed di-function signal for producing a first output pulse; and second gating means operable in response to low voltage levels appearing simultaneously in the di-function signal and the delayed di-function signal for producing a second output pulse.

37. A device for deconverting a di-function signal representing alternate $+1$ and $-1$ difunction values, said device comprising: means for delaying the di-function signal for a predetermined time interval, first output means for producing an output signal when the di-function signal and the delayed di-function signal have simultaneous $+1$ di-function values, and second output means for producing an output signal whenever the di-function signal and said delayed di-function signal have simultaneous $-1$ di-function values.

38. In combination: a first flip-flop producing a first di-function signal having alternate relatively high and low voltage levels; a second flip-flop; means for producing a periodic timing signal having a predetermined period; means, conductively coupled between said first and second flip-flops and responsive to said timing signal, for triggering said second flip-flop into producing a second di-function signal identical to said first di-function signal but delayed one said predetermined period; and output means for producing an output signal whenever said first and second di-function signals have identical levels for said predetermined period.

39. In combination: first means for producing an output signal having alternate relatively high and low voltage levels, representing first and second numbers respectively, each of said voltage levels appearing for an integral number of timing intervals; second means for delaying the output signal of said first means for one timing interval; first gating means coupled to said first and second means for producing a high voltage level when said output signal and the delayed output signals are simultaneously at their high voltage level; and second gating means coupled to said first and second means for producing a high voltage level when said output signal and said delayed output signal are simultaneously at their low voltage level.

References Cited in the file of this patent

UNITED STATES PATENTS

| | | |
|---|---|---|
| 2,176,742 | La Pierre | Oct. 17, 1939 |
| 2,432,188 | Bliss | Dec. 9, 1947 |
| 2,472,396 | Schoenbaum | June 7, 1949 |
| 2,474,116 | Rendel | June 21, 1949 |
| 2,510,093 | Ferguson et al. | June 6, 1950 |
| 2,537,427 | Seid et al. | Jan. 9, 1951 |
| 2,557,384 | Klein | June 19, 1951 |
| 2,576,900 | Brockman | Nov. 27, 1951 |
| 2,611,536 | Barrow | Sept. 23, 1952 |
| 2,630,562 | Johnson | Mar. 3, 1953 |
| 2,643,820 | Williams | June 30, 1953 |
| 2,656,106 | Stabler | Oct. 20, 1953 |
| 2,665,411 | Frady | Jan. 5, 1954 |
| 2,680,241 | Gridley | June 1, 1954 |
| 2,685,049 | Steinberg | July 27, 1954 |
| 2,685,082 | Beman et al. | July 27, 1954 |
| 2,693,907 | Tootil | Nov. 9, 1954 |
| 2,700,696 | Barker | Jan. 25, 1955 |
| 2,715,678 | Barney | Aug. 16, 1955 |
| 2,724,780 | Harris | Nov. 22, 1955 |
| 2,733,430 | Steele | Jan. 31, 1956 |
| 2,775,402 | Weiss | Dec. 25, 1956 |

FOREIGN PATENTS

| | | |
|---|---|---|
| 975,941 | France | Oct. 17, 1950 |

OTHER REFERENCES

High Speed Computing Devices by Engineering Research Associates, McGraw-Hill Book Co., Inc. (1950). Copy QA75E5, page 272.